United States Patent
Wolk et al.

(10) Patent No.: US 9,412,018 B2
(45) Date of Patent: *Aug. 9, 2016

(54) SYSTEMS AND METHODS FOR NOTE CONTENT EXTRACTION AND MANAGEMENT USING SEGMENTED NOTES

(71) Applicant: 3M INNOVATIVE PROPERTIES COMPANY, St. Paul, MN (US)

(72) Inventors: Diane R. Wolk, Woodbury, MN (US); Cristin E. Moran, St. Paul, MN (US); David M. Mahli, Woodbury, MN (US); Guruprasad Somasundaram, Minneapolis, MN (US); Richard J. Moore, Maplewood, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/612,009

(22) Filed: Feb. 2, 2015

(65) Prior Publication Data

US 2015/0186719 A1 Jul. 2, 2015

Related U.S. Application Data

(63) Continuation of application No. 14/325,966, filed on Jul. 8, 2014, now Pat. No. 8,977,047.

(60) Provisional application No. 61/844,140, filed on Jul. 9, 2013, provisional application No. 61/844,152, filed on Jul. 9, 2013, provisional application No. 61/844,176, filed on Jul. 9, 2013.

(51) Int. Cl.
*G06K 9/00* (2006.01)
*G06K 9/46* (2006.01)
(Continued)

(52) U.S. Cl.
CPC ........ *G06K 9/00463* (2013.01); *G06K 9/00456* (2013.01); *G06K 9/00671* (2013.01);
(Continued)

(58) Field of Classification Search
CPC ... G06K 9/00463; G06K 15/00; G06K 15/02; G06K 2207/1012; G06K 2215/00; G06T 7/408; G06T 7/0081; G06T 2207/10024; G06T 2207/30176

See application file for complete search history.

(56) References Cited

U.S. PATENT DOCUMENTS 5,319,745 A 6/1994 Vinsonneau
5,465,165 A * 11/1995 Tanio .................... G06K 15/00
   345/419

(Continued)

FOREIGN PATENT DOCUMENTS

EP   1182861    2/2002
JP   2009-20813  1/2009

(Continued)

OTHER PUBLICATIONS

Boykov, "Graph Cuts and Efficient N-D Image Segmentation", International Journal of Computer Vision, 2006, vol. 70, No. 2, pp. 109-131.

(Continued)

*Primary Examiner* — Amir Alavi
(74) *Attorney, Agent, or Firm* — X. Christina Huang

(57) ABSTRACT

Techniques for creating and manipulating software notes representative of physical notes are described. A note management system comprises a note recognition module configured to receive image data capturing a note having a plurality of color segments, wherein the note recognition module is further configured to generate a plurality of indicators, each indicator indicative of a color class of a pixel or group of pixels within the image data and based on color values of the pixel or group of pixels; and a note extraction module configured to determine general boundaries of the color segments of the note based on the plurality of indicators and extract content using the general boundaries, the content comprising a plurality of content pieces, each of the content pieces corresponding to one of the color segments of the note.

20 Claims, 21 Drawing Sheets

(51) Int. Cl.
*G06T 7/00* (2006.01)
*G06K 9/18* (2006.01)
*G06T 7/40* (2006.01)

(52) U.S. Cl.
CPC .............. *G06K 9/18* (2013.01); *G06K 9/4604* (2013.01); *G06K 9/4652* (2013.01); *G06T 7/0081* (2013.01); *G06T 7/408* (2013.01); *G06K 2009/4666* (2013.01); *G06T 2207/10004* (2013.01); *G06T 2207/10024* (2013.01); *G06T 2207/20141* (2013.01); *G06T 2207/30176* (2013.01)

(56) References Cited

U.S. PATENT DOCUMENTS

| | | | |
|---|---|---|---|
| 5,898,434 | A | 4/1999 | Small |
| 6,351,559 | B1 | 2/2002 | Zhou |
| 6,504,956 | B1 | 1/2003 | Gannage |
| 6,721,733 | B2 | 4/2004 | Lipson |
| 6,771,813 | B1 | 8/2004 | Katsuyama |
| 7,035,463 | B1 | 4/2006 | Monobe |
| 7,038,713 | B1 | 5/2006 | Matama |
| 7,072,512 | B2 * | 7/2006 | Mehrotra .................. G06T 9/00 375/E7.077 |
| 7,343,415 | B2 | 3/2008 | Kenner |
| 7,561,310 | B2 | 7/2009 | Joyce |
| 7,573,598 | B2 | 8/2009 | Cragun |
| 7,774,479 | B2 | 8/2010 | Kenner |
| 7,837,094 | B2 | 11/2010 | Rhoads |
| 7,999,966 | B2 * | 8/2011 | Fritz .................. G06Q 30/0283 358/1.18 |
| 8,069,173 | B2 | 11/2011 | Munekuni |
| 8,113,432 | B2 | 2/2012 | Kimura |
| 8,139,852 | B2 * | 3/2012 | Shinjo .................. G06K 9/2018 382/165 |
| 8,238,666 | B2 | 8/2012 | Besley |
| 8,256,665 | B2 | 9/2012 | Rhoads |
| 8,380,040 | B2 | 2/2013 | Carter |
| 8,416,466 | B2 | 4/2013 | Takata |
| 8,429,174 | B2 | 4/2013 | Ramani |
| 8,457,449 | B2 | 6/2013 | Rhoads |
| 8,503,791 | B2 | 8/2013 | Conwell |
| 8,542,889 | B2 | 9/2013 | Sarnoff |
| 8,543,926 | B2 | 9/2013 | Giles |
| 8,558,913 | B2 | 10/2013 | Pillman |
| 8,600,167 | B2 | 12/2013 | Showering |
| 8,655,068 | B1 | 2/2014 | Li |
| 8,891,862 | B1 * | 11/2014 | Wolk .................. G06K 9/4652 382/162 |
| 8,977,047 | B2 * | 3/2015 | Wolk .................. G06K 9/4652 382/165 |
| 2004/0017400 | A1 | 1/2004 | Ly |
| 2005/0091578 | A1 | 4/2005 | Madan |
| 2006/0039045 | A1 | 2/2006 | Sato |
| 2006/0077468 | A1 * | 4/2006 | Loce .................. H04N 1/4058 358/3.06 |
| 2006/0221357 | A1 | 10/2006 | Uzawa |
| 2007/0089049 | A1 | 4/2007 | Gormish |
| 2007/0110277 | A1 | 5/2007 | Hayduchok |
| 2007/0176780 | A1 | 8/2007 | Hart |
| 2008/0021701 | A1 | 1/2008 | Bobick |
| 2008/0075364 | A1 * | 3/2008 | Speigle .................. H04N 1/60 382/167 |
| 2008/0240493 | A1 | 10/2008 | Yoda |
| 2008/0292189 | A1 | 11/2008 | Morimoto |
| 2009/0015676 | A1 | 1/2009 | Ke |
| 2010/0023878 | A1 | 1/2010 | Douris |
| 2010/0096452 | A1 | 4/2010 | Habraken |
| 2010/0191772 | A1 | 7/2010 | Brown |
| 2010/0202680 | A1 | 8/2010 | Hamasaki |
| 2011/0066658 | A1 | 3/2011 | Rhoads |
| 2011/0164815 | A1 * | 7/2011 | Sharma ............... G06F 17/3025 382/165 |
| 2011/0182508 | A1 | 7/2011 | Ives |
| 2011/0187731 | A1 | 8/2011 | Tsuchida |
| 2011/0249897 | A1 | 10/2011 | Chaki |
| 2011/0285123 | A1 | 11/2011 | Wittke |
| 2012/0014456 | A1 * | 1/2012 | Martinez Bauza .... G06T 7/0022 375/240.25 |
| 2012/0041330 | A1 | 2/2012 | Prichep |
| 2012/0151577 | A1 | 6/2012 | King |
| 2012/0320410 | A1 | 12/2012 | Kakegawa |
| 2012/0324372 | A1 | 12/2012 | Kowalkiewicz |
| 2013/0054636 | A1 | 2/2013 | Tang |
| 2013/0163047 | A1 | 6/2013 | Miyamoto |
| 2013/0217440 | A1 | 8/2013 | Lord |
| 2013/0227476 | A1 | 8/2013 | Frey |
| 2013/0258117 | A1 | 10/2013 | Penov |
| 2013/0258122 | A1 | 10/2013 | Keane |
| 2013/0271784 | A1 | 10/2013 | Nakajima |
| 2014/0024411 | A1 | 1/2014 | Rao |
| 2014/0056512 | A1 | 2/2014 | Lerios |
| 2015/0186719 | A1 * | 7/2015 | Wolk .................. G06K 9/4652 382/164 |

FOREIGN PATENT DOCUMENTS

| | | |
|---|---|---|
| JP | 2011-90486 | 5/2011 |
| WO | WO 2012-070935 | 5/2012 |
| WO | WO 2013-085512 | 6/2013 |
| WO | WO 2013-184767 | 12/2013 |

OTHER PUBLICATIONS

Davidson, "Calculation of Color Differences From Visual Sensitivity Ellipsoids", Journal of the Optical Society of America, Dec. 1951, vol. 41, No. 12, pp. 1052-1055.

Everitt, "Two Worlds Apart: Bridging the Gap Between Physical and Virtual Media for Distributed Design Collaboration", CHI 2003, Apr. 5-10, 2003, 8 pages.

Felzenszwalb, "Efficient Graph-Based Image Segmentation", International Journal of Computer Vision, 2004, vol. 59, No. 2, pp. 167-181.

Fisher, "Change Detection in Color Images", Proceedings of 7th IEEE Conference on Computer Vision and Pattern, 1999, 6 pages.

Frome, "Visibility of Borders: Separate and Combined Effects of Color Differences, Luminance Contrast, and Luminance Level", J. Opt. Soc. Am., Feb. 1981, vol. 71, No. 2, pp. 145-150.

Geyer, "Experiences From Employing Evernote As a Tool for Documenting Collaborative Design Processes", Conference on Designing Interactive System DIS 2012, Workshop on Supporting Reflection in and on Design Processes, Jun. 12, 2012, 2 pages. .

Gur, "Isoluminant Stimuli May Not Expose the Full Contribution of Color to Visual Functioning: Spatial Contrast Sensitivity Measurements Indicate interaction Between Color and Luminance Processing", Vision Research, Jul. 7, 1992, vol. 32, No. 7, pp. 1253-1262.

Hsieh, "Peripheral Display of Digital handwritten notes", CHI Proceedings of the SIGCHI Conference on Human Factors in Computing Systems, Apr. 22-27, 2006, pp. 285-288.

"King jim Shot Note", [Online], [retrieved from internet on Sep. 17, 2014], URL :<http://www.kingjim.co.jp/english/products/shotnote/>, 2 pages.

Klemmer, "The Designers Outpost: A Tangible Interface for Collaborative Web Site Design", In Proceedings of UIST, 2001, 10 pages.

K-SVD, "An Algorithm for Designing Overcomplete Dictionaries for Sparse Representation", IEEE Transactions on Signal Processing, Nov. 2006, vol. 54, No. 11, pp. 4311-4322.

Madhukar, New Decision Support Tool for Acute Lymphoblastic Leukemia Classification, Feb. 9, 2012, 12 pages.

Masaoka, "Fast and Accurate Model for Optimal Color Computation", Optics Letters, Jun. 15, 2010, vol. 35, No. 12, pp. 2031-2033.

Mazzei, "Extraction and Classification of Handwritten Annotations", Sep. 26, 2010, 4 pages.

Mika, "Fisher Discriminant Analysis With Kernels", Neural Networks for Signal Processing IX, 1999. Proceedings of the 1999 IEEE Signal Processing Society Workshop in Neural Networks for Signal Processing IX, 1999. Proceedings of the 1999 IEEE Signal Processing Society Workshop, Aug. 1999, pp. 41-48.

(56) References Cited

OTHER PUBLICATIONS

Rajala, "Visual Sensitivity to Color-Varying Stimuli", Human Vision, Visual Processing and Digital Display III, Proc. SPIE. Aug. 27, 1992, vol. 1666, pp. 375-386.

Sharma, "The CIEDE2000 Color-Difference Formula: Implementation Notes, Supplementary Test Data, and Mathematical Observations", Color Research & Application, Feb. 2005, vol. 30, No. 1, pp. 21-30.

Yang, "Photonic Crystal Changes Color When Exposed to an Explosion", Nanotechnology, SPIE Inetrnational Year of Light 2015, Apr. 25, 2011, [online]; [retrieved from internet on Sep. 18, 2014], URL:<http://spie.org/x47872.xml?pf=true&ArticleID=x47872>, 3 pages.

PCT International Search Report PCT/US14/45780 dated Feb. 4, 2015, 2 pages.

PCT International Search Report PCT/US2014/045669 dated Nov. 3, 2014, 2 pages.

PCT International Search Report PCT/US2014/045666 dated Oct. 31, 2014, 2 pages.

* cited by examiner

SYSTEMS AND METHODS FOR NOTE CONTENT EXTRACTION AND MANAGEMENT USING SEGMENTED NOTES

This application claims the benefit of U.S. Provisional Application Nos. 61/844,140, 61/844,152 and 61/844,176, filed Jul. 9, 2013, the entire content of each being incorporated herein by reference. This application is a continuation of application Ser. No. 14/325,966 filed on Jul., 08, 2014 now U.S. Pat. No. 8977047.

TECHNICAL FIELD

The present disclosure relates to note content capturing, recognition, extraction, and/or management tools and systems.

BACKGROUND

Physical notes have been broadly used in recording, sharing, and communicating ideas and information. For example, during a collaboration session (e.g., brainstorming session), participants write down ideas on Post-It® notes, whiteboard, or paper, and then share with one another. In addition, people commonly use notes throughout the day to memorialize information or content which the individual does not want to forget. As additional examples, people frequently use notes as reminders of actions or events to take in the future, such as to make a telephone call, revise a document or to fill out a time sheet.

For example, in many situations people participate in a collaboration session by writing information on paper-based notes, such as Post-it® notes. Paper Post-it® notes can readily be removed from a dispenser pad of sticky-back paper Post-it® notes and applied to various surfaces, such as whiteboards, documents, the tops of desks, telephones, or the like. Information can be written on paper Post-it® notes either before or after the paper Post-it® notes are detached from their dispenser pad or attached to their target surfaces. Paper Post-it® notes can be easily moved from one surface to another, such as between documents or between documents and the tops of desks, they can overlap edges or boundaries of documents, they can be layered, and they can be moved with the objects to which they are attached.

Software programs currently exist which permit computer users to create a software-based note in a digital form and to utilize the digital note within a computing environment. For example, a computer user may create a digital note and "attach" the digital note to an electronic document a desktop or electronic workspace presented by the computing environment.

SUMMARY

In general, the disclosure describes techniques for creating and manipulating software notes representative of physical notes.

In one example, a method comprises receiving, by the one or more processors, image data comprising a visual representation of a note having a plurality of color segments and generating, by the one or more processors, a plurality of indicators, each indicator indicative of a color class of a respective pixel or group of pixels in the image data and based on color values of the pixel or group of pixels. The method further comprises, based on the generated plurality of indicators, determining, by the one or more processors, general boundaries within the image data of the color segments, and extracting, by the one or more processors and from the image data, content comprising a set of multiple content pieces using the general boundaries, each of the content pieces corresponding to a different one of the color segments of the note.

In another example, a note management system comprises a note recognition module configured to receive image data capturing a note having a plurality of color segments, wherein the note recognition module is further configured to generate a plurality of indicators, each indicator indicative of a color class of a pixel or group of pixels within the image data and based on color values of the pixel or group of pixels; and a note extraction module configured to determine general boundaries of the color segments of the note based on the plurality of indicators and extract content using the general boundaries, the content comprising a plurality of content pieces, each of the content pieces corresponding to one of the color segments of the note.

In another example, a non-transitory computer-readable storage device comprises instructions that cause a programmable processor to receive image data containing a visual representation of a scene having a plurality of physical notes, each of the plurality of physical notes having a plurality of color segments. The instructions cause the processor to generate, by the one or more processors, a plurality of indicators, each indicator indicative of a color class of color values of one or more pixel within the image data, process the image data to determine, based on the plurality of indicators, a boundary within the image data of a first physical note of the plurality of physical notes, and process the image data to determine, based on the indicators and the boundary for the physical note, boundaries for each of the color segments of the first physical note. The instructions cause the processor to extract, from the image data, respective content for each of the color segments of the first physical note using and the boundaries for each of the color segments of the physical note, create a digital note representative of the first physical note, the digital note having data indicating each of the color segments for the physical note, and associate the respective content pieces extracted from the image data with the corresponding color segments of the digital note.

BRIEF DESCRIPTION OF THE DRAWINGS

The accompanying drawings are incorporated in and constitute a part of this specification and, together with the description, explain the advantages and principles of the invention.

DETAILED DESCRIPTION

Figure 1:
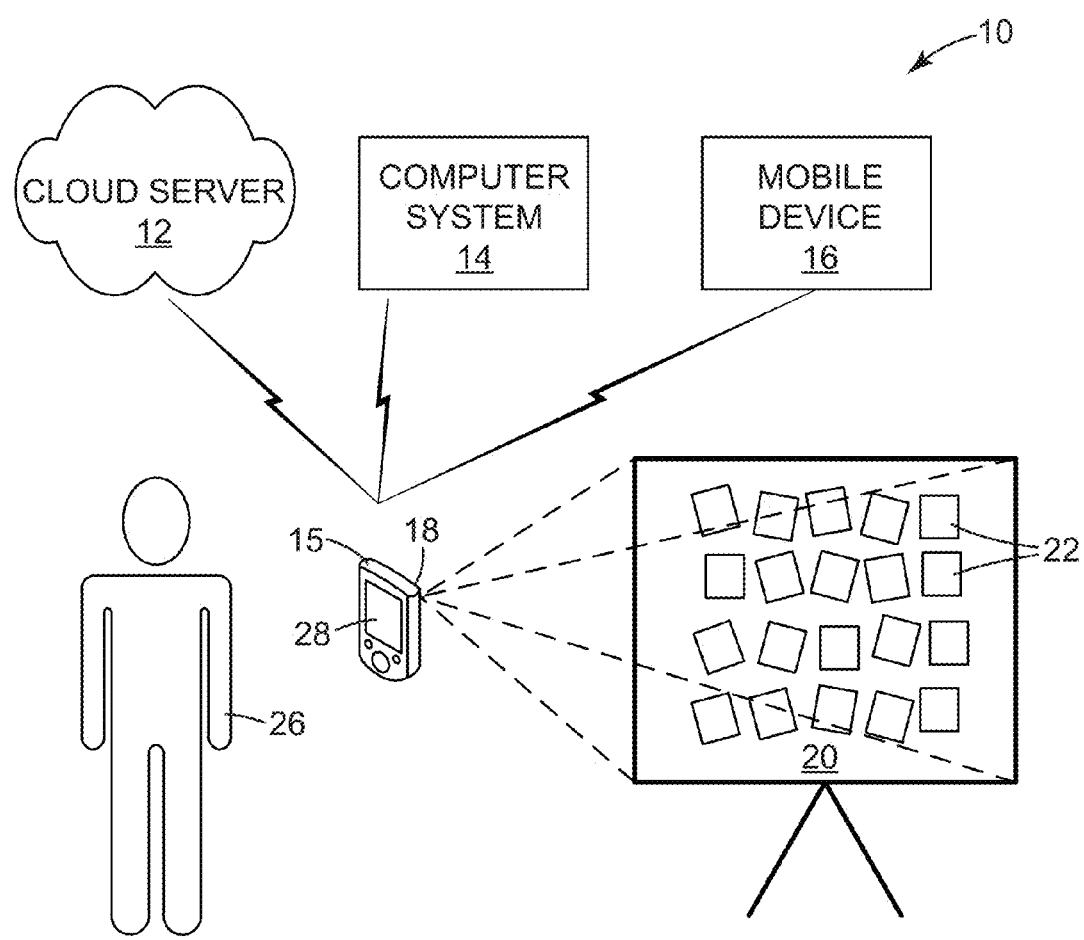
FIG. 1 is a representation illustrating one example of a user capturing an image of a workspace with notes using an image capture device on a mobile device.

The present disclosure describes techniques for creating and manipulating software notes representative of physical notes. For example, techniques are described for recognizing physical notes present within a physical environment, capturing information therefrom and creating corresponding digital representations of the physical notes, referred to herein as digital notes or software-based notes. Further, at least some aspects of the present disclosure are directed to techniques for managing multiple notes, such as storing, retrieving, editing the digital notes, categorizing and grouping the digital notes, or the like.

Notes have been broadly used in recording, sharing, and communicating ideas and information. For example, during a collaboration session (e.g., brainstorming session), participants write down ideas on Post-It™ notes, whiteboard, or paper, and then share with one another. At least some aspects of the present disclosure are directed to systems and methods of capturing multiple notes and extracting content of notes. In some embodiments, at least some of the notes include a mark to facilitate the recognition and extraction of the notes. In some cases, the notes are captured and identified/recognized in one visual representation of a scene. A visual representation of a scene, for example, can be a digital photograph, or still fame from video of note(s) and the surrounding environment. Further, at least some aspects of the present disclosure are directed to systems and methods of managing multiple notes, such as storing and retrieving the notes, categorizing and grouping the notes, or the like. In some cases, the note management system can improve the efficiency in capturing and extracting note content from a large number of notes. In addition, the note management system can improve the efficiency in grouping and managing notes.

In general, notes can include physical notes and digital notes. Physical notes generally refer to objects with a general boundary and recognizable content. Physical notes can include the resulting objects after people write, draw, or enter via other type of inputs on the objects, for example, paper, white board, or other objects accepting the inputs. By way of examples, physical notes can include hand-written Post-It™ notes, paper, or film, white-board with drawings, posters, and signs. In some cases, physical notes can be generated using digital means, e.g. printing onto printable Post-It™ notes or printed document. In some cases, one object can include several notes. For example, several ideas can be written on a piece of poster paper or a white-board. In some implementations, to facilitate the recognition of these notes, marks, such as lines, shapes, colors, symbols, markers, or stickers, can be applied to the edges of the notes. Physical notes can be two-dimensional or three dimensional. Physical notes can have various shapes and sizes. For example, a physical note may be a 7.62×7.62 cm (3×3 inches) note; a physical note may be a 66.04×99.06 cm (26×39 inches) poster; and a physical note may be a triangular metal sign. In some cases, physical notes have known shapes and/or sizes that conform to standards, such as legal, A3, A4, and other size standards, and known shapes, which may not be limited to geometric shapes, such as stars, circles, rectangles, or the like. In other cases, physical notes may have non-standardized sizes and/or irregular shapes. Digital notes generally refer to digital objects with information and/or ideas. Digital notes can be generated using digital inputs. Digital inputs can include, for example, keyboards, touch screens, digital cameras, digital recording devices, stylus, digital pens, or the like. In some cases, digital notes may be representative of physical notes.

In some cases, notes are used in a collaboration space. Collaboration space generally refers to a gathering area allowing more than one person to share ideas and thoughts with each other. The collaboration space can include virtual spaces allowing a group of persons to share ideas and thoughts remotely, besides the gathering area.

FIG. 1 illustrates an example of a note recognition environment 10. In the example of FIG. 1, environment 10 includes a mobile device 15 to capture and recognize one of more notes 22 from a workspace 20. As described herein, mobile device provides an execution environment for one or more software applications that, as described, can efficiently capture and extract note content from a large number of physical notes, such as the collection of notes 22 from workspace 20. In this example, notes 22 may be the results of a collaborative brainstorming session having multiple participants. As described, mobile device 15 and the software executing thereon may perform a variety of note-related operations, including automated creation of digital notes representative of physical notes 22 of workspace 20.

In the example implementation, mobile device 15 includes, among other components, an image capture device 18 and a presentation device 28. In addition, although not shown in FIG. 1, mobile device 15 may include one or more processors, microprocessors, internal memory and/or data storage and other electronic circuitry for executing software or firmware to provide the functionality described herein.

In general, image capture device 18 is a camera or other component configured to capture image data representative of workspace 20 and notes 22 positioned therein. In other words, the image data captures a visual representation of an environment, such as workspace 20, having a plurality of physical notes. Although discussed as a camera of mobile device 15, image capture device 18 may comprise other components capable of capturing image data, such as a video recorder, an infrared camera, a CCD (Charge Coupled Device) array, a laser scanner, or the like. Moreover, the captured image data can include at least one of an image, a video, a sequence of images (i.e., multiple images taken within a time period and/or with an order), a collection of images, or the like, and the term input image is used herein to refer to the various example types of image data.

Presentation device 28 may include, but not limited to, an electronically addressable display, such as a liquid crystal display (LCD) or other type of display device for use with mobile device 28. In some implementations, mobile device 15 generates the content to display on presentation device 28 for the notes in a variety of formats, for example, a list, grouped in rows and/or column, a flow diagram, or the like. Mobile device 15 may, in some cases, communicate display information for presentation by other devices, such as a tablet computer, a projector, an electronic billboard or other external device.

As described herein, mobile device 15, and the software executing thereon, provide a platform for creating and manipulating digital notes representative of physical notes 22. For example, in general, mobile device 15 is configured to process image data produced by image capture device 18 to detect and recognize at least one of physical notes 22 positioned within workspace 20. In some examples, the mobile device 15 is configured to recognize note(s) by determining the general boundary of the note(s). After a note is recognized, mobile device 15 extracts the content of at least one of the one or more notes, where the content is the visual information of note 22.

As further described below, mobile device 15 may implement techniques for automated detection and recognition of physical notes 22 and extraction of information, content or other characteristics associated with each of the physical notes. For example, mobile device 15 may allow user 26 fine grain control over techniques used by mobile device 15 to detect and recognize physical notes 22. As one example, mobile device 15 may allow user 26 to select between marker-based detection techniques in which one or more of notes 22 includes a physical fiducial mark on the surface of the note or non-marker based techniques in which no fiducial mark is used.

In addition, mobile device 15 provides user 26 with an improved electronic environment for generating and manipulating corresponding digital notes representative of physical notes 22. As another example, mobile device 15 may provide mechanisms allowing user 26 to easily add digital notes to and/or delete digital notes from a set of digital notes representative of the brainstorming activity associated with workspace 20. In some example implementations, mobile device 15 provides functionality by which user 26 is able to record and manage relationships between groups of notes 22.

In some example implementations, mobile device 15 provides functionality by which user 26 is able to export the digital notes to other systems, such as cloud-based repositories (e.g., cloud server 12) or other computing devices (e.g., computer system 14 or mobile device 16).

In the example of FIG. 1, mobile device 15 is illustrated as a mobile phone. However, in other examples, mobile device 15 may be a tablet computer, a personal digital assistant (PDA), a laptop computer, a media player, an e-book reader, a wearable computing device (e.g., a watch, eyewear, a glove), or any other type of mobile or non-mobile computing device suitable for performing the techniques described herein.

Figure 2:
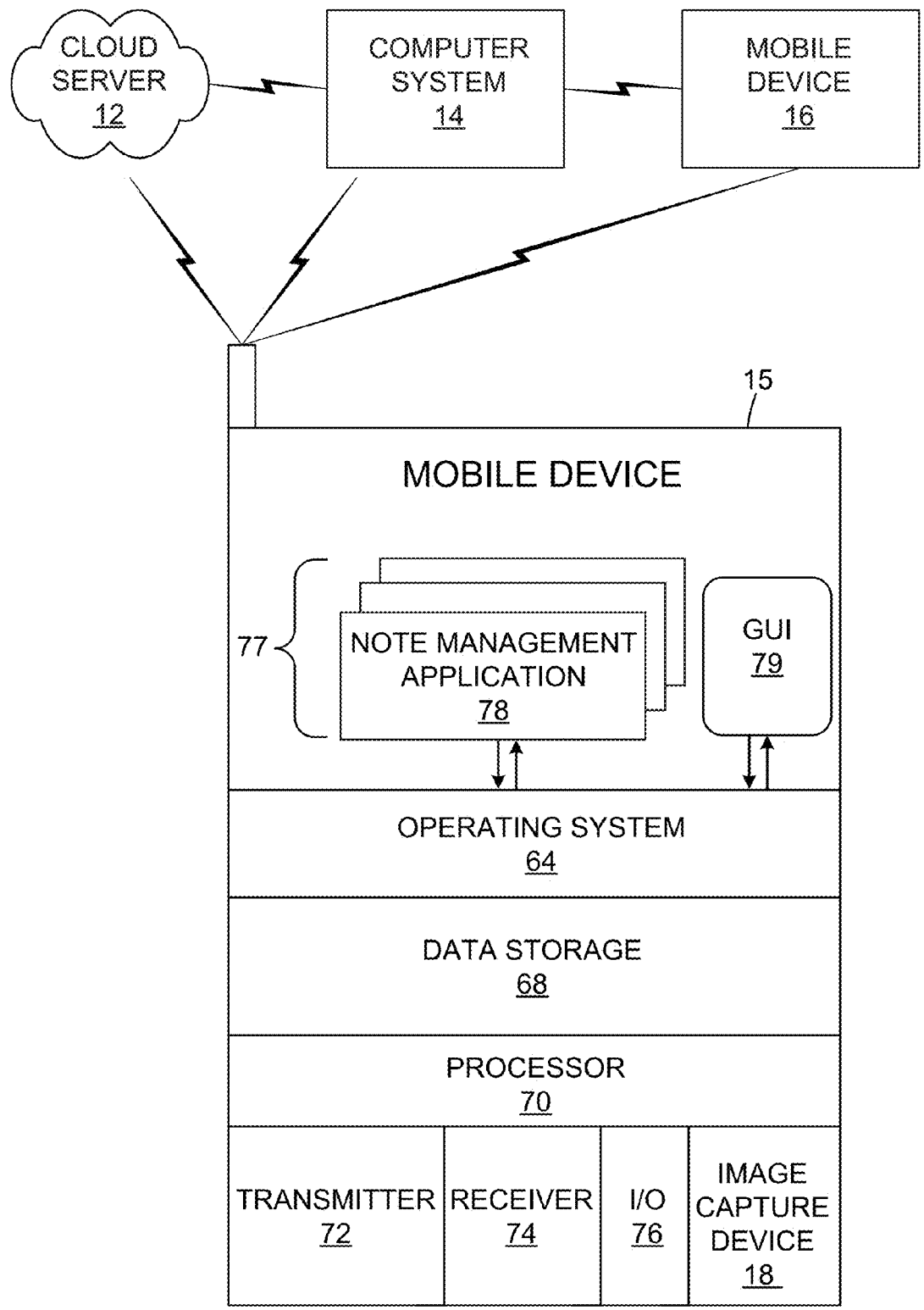
FIG. 2 is a block diagram illustrating one example of a mobile device.

FIG. 2 illustrates a block diagram illustrating an example of a mobile device that operates in accordance with the techniques described herein. For purposes of example, the mobile device of FIG. 2 will be described with respect to mobile device 15 of FIG. 1

In this example, mobile device 15 includes various hardware components that provide core functionality for operation of the device. For example, mobile device 15 includes one or more programmable processors 70 configured to operate according to executable instructions (i.e., program code), typically stored in a computer-readable medium or data storage 68 such as static, random-access memory (SRAM) device or Flash memory device. I/O 76 may include one or more devices, such as a keyboard, camera button, power button, volume button, home button, back button, menu button, or presentation device 28 as described in FIG. 1. Transmitter 72 and receiver 74 provide wireless communication with other devices, such as cloud server 12, computer system 14, or other mobile device 16 as described in FIG. 1, via a wireless communication interface as described in FIG. 1, such as but not limited to high-frequency radio frequency (RF) signals. Mobile device 15 may include additional discrete digital logic or analog circuitry not shown in FIG. 2.

In general, operating system 64 executes on processor 70 and provides an operating environment for one or more user applications 77 (commonly referred to "apps"), including note management application 78. User applications 77 may, for example, comprise executable program code stored in computer-readable storage device (e.g., data storage 68) for execution by processor 70. As other examples, user applications 77 may comprise firmware or, in some examples, may be implemented in discrete logic.

In operation, mobile device 15 receives input image data and processes the input image data in accordance with the techniques described herein. For example, image capture device 18 may capture an input image of an environment having a plurality of notes, such as workspace 20 of FIG. 1 having of notes 22. As another example, mobile device 15 may receive image data from external sources, such as cloud server 15, computer system 14 or mobile device 16, via receiver 74. In general, mobile device 15 stores the image data in data storage 68 for access and processing by note management application 78 and/or other user applications 77.

As shown in FIG. 2, user applications 77 may invoke kernel functions of operating system 64 to output a graphical user interface (GUI) 79 for presenting information to a user of mobile device. As further described below, note management application 78 may construct and control GUI 79 to provide an improved electronic environment for generating and manipulating corresponding digital notes representative of physical notes 22. For example, note management application 78 may construct GUI 79 to include a mechanism that allows user 26 to easily add digital notes to and/or deleting digital notes from defined sets of digital notes recognized from the image data. In some example implementations, note management application 78 provides functionality by which user 26 is able to record and manage relationships between groups of the digital notes by way of GUI 79.

Figure 3:
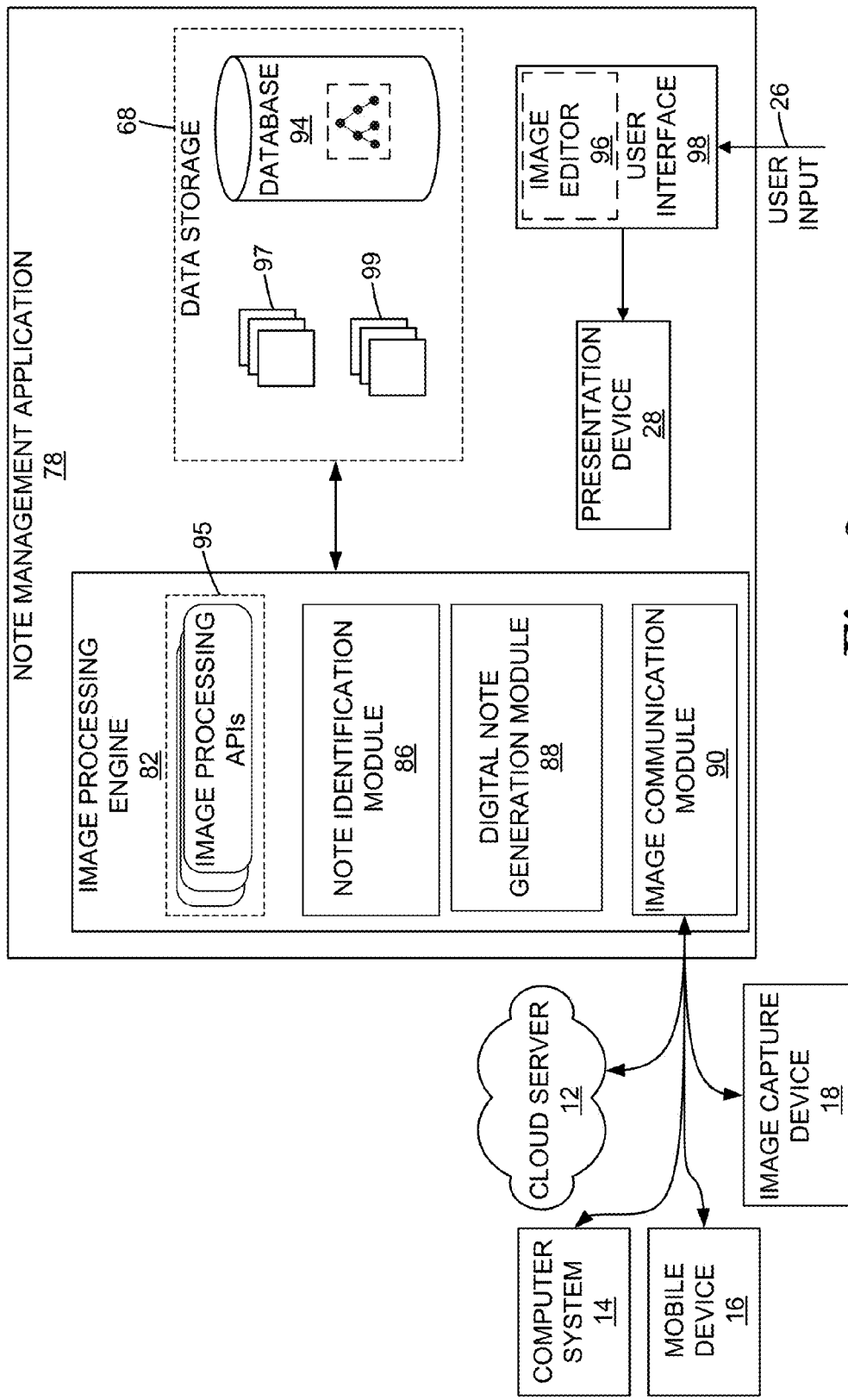
FIG. 3 is a block diagram illustrating one example of a user application to process the input image.

FIG. 3 illustrates a block diagram illustrating one example implementation of note management application 78 that operates in accordance with the techniques described herein.

Although described as a user application 77 executing on mobile device 15, the examples described herein may be implemented on any computing device, such as cloud server 12, computer system 14, or other mobile devices.

In this example, user application 78 includes image processing engine 82 that provides image processing and object recognition functionality. Image processing engine 82 may include image communication module 90, note identification module 86 and digital note generation module 88. In addition, image processing engine 82 includes image processing APIs 95 that provide a library of image manipulation functions, e.g., image thresholding, masking, filtering, edge detection, and the like, for use by the other components of image processing engine 82.

In general, image data may be stored in storage device 68. In this example, note management application 78 stores images 97 within data storage device 68. Each of images 97 may comprise pixel data for environments having a plurality of physical images, such as workspace 20 of FIG. 1.

As described herein, note identification module 86 processes images 97 and identifies (i.e., recognizes) the plurality of physical notes in the images. The input image may be processed by note identification module 86 using marker and/or non-marker detection processes. Digital note generation module 88 generates digital notes 99 corresponding to the physical notes recognized within the image 97. For example, each of digital notes 99 corresponds to one of the physical notes identified in an input image 97. During this process, digital note generation module may update database 94 to include a record of the digital note, and may store within the database information (e.g., content) extracted from the input image within boundaries determined for the physical note as detected by note identification module 86. Moreover, digital note generation module 88 may store within database 94 metadata associating the digital notes into one or more groups of digital notes.

Communication module 90 controls communication of image data between mobile device 15 and external devices, such as cloud server 12, computer system 14, mobile device 16, or image capture device 18. In some examples, communication modules 90 may, for example, allow a user to communicate processed or unprocessed images 97 of environments and/or digital notes and associated information extracted therefrom including metadata from database 68. In some examples, image communication module 90 exports this data to a zip file that may be communicated by FTP, HTTP, email, Bluetooth or other mechanism.

In the example of FIG. 1, note management application 78 includes user interface 98 that constructs and controls GUI 79. As described below, user interface 98 may, in some examples, output for display an input image 97 overlaid with the plurality of digital notes 99, where each of the digital notes is overlaid in place of a corresponding physical note. In addition, user interface 98 may display a group of digital notes 99 that has been designated by the user. This group of digital notes 99 may be, for example, a subset of the digital notes recognized in a particular input image 97. User interface 98 may display this designated group (set) of the digital notes on a second portion of GUI 79 and allow user 26 to easily add or remove digital notes 99 from the designated group.

In some example implementations, user interface 98 provides an image editor 96 that allow user 26 to edit the overlay image and/or the digital notes. In another example, digital note generation module 88 may include a process or processes that enhance the extracted information from the input image.

Additional example details of note management application 78 for detecting and recognizing physical notes are described in U.S. Patent Application 61/844,140, filed July 9, entitled SYSTEMS AND METHODS FOR NOTE RECOGNITION AND MANAGEMENT USING COLOR CLASSIFICATION," U.S. Patent Application 61/844,152, filed Jul. 9, 2013, entitled "SYSTEMS AND METHODS FOR NOTE CONTENT EXTRACTION AND MANAGEMENT USING SEGMENTED NOTES, and U.S. Patent Application 61/844, 176, filed Jul. 9, 2013, "SYSTEMS AND METHODS FOR NOTE CONTENT EXTRACTION AND MANAGEMENT BY SEGMENTING NOTES," the entire contents of each of which are incorporated herein by reference.

Figure 4A:
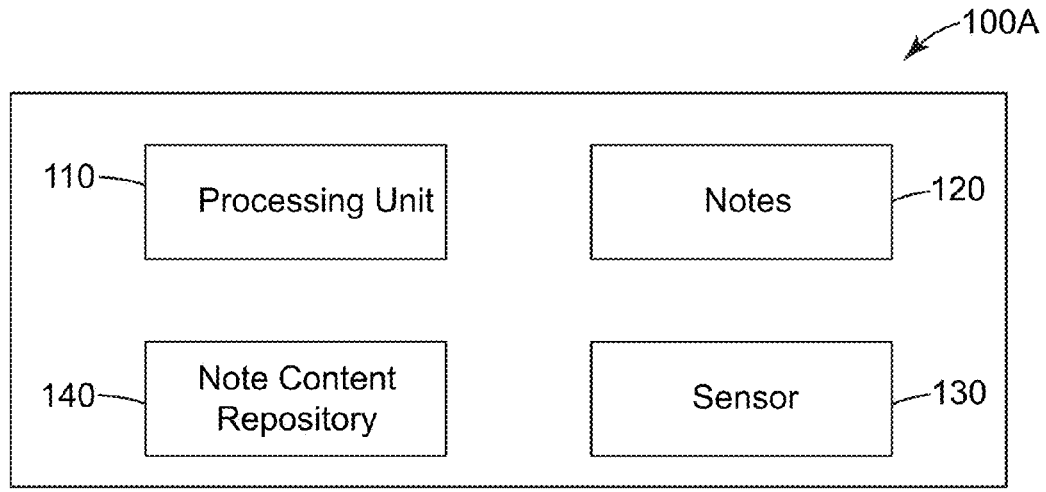
FIG. 4A illustrates an embodiment of a note recognition system.

To better understand the present disclosure, FIG. 4A illustrates an embodiment of a note recognition system 100A. The system 100A can include a processing unit 110, one or more notes 120, a sensor 130, and note content repository 140. The processing unit 110 can include one or more processors, microprocessors, computers, servers, and other computing devices. The sensor 130, for example, an image sensor, is configured to capture a visual representation of a scene having the one or more notes 120. The sensor 130 can include at least one of a camera, a video recorder, an infrared camera, a CCD (Charge Coupled Device) array, a scanner, or the like. The visual representation can include at least one of an image, a video, a sequence of images (i.e., multiple images taken within a time period and/or with a order), a collection of images, or the like. The processing unit 110 is coupled to the sensor 130 and configured to receive the visual representation. In some cases, the processing unit 110 is electronically coupled to the sensor 130. The processing unit 110 is configured to recognize at least one of the one or more notes 120 from the visual representation. In some embodiments, the processing unit 110 is configured to recognize note(s) by determining the general boundary of the note(s). After a note is recognized, the processing unit 110 extracts the content of the note. In some cases, the processing unit 110 is configured to recognize and extract the content of more than one note 120 from a visual representation of a scene having those notes 120.

In some cases, the processing unit 110 can execute software or firmware stored in non-transitory computer-readable medium to implement various processes (e.g., recognize notes, extract notes, etc.) for the system 100A. The note content repository 140 may run on a single computer, a server, a storage device, a cloud server, or the like. In some other cases, the note content repository 140 may run on a series of networked computers, servers, or devices. In some implementations, the note content repository 140 includes tiers of data storage devices including local, regional, and central. The notes 120 can include physical notes arranged orderly or randomly in a collaboration space and the sensor 130 generates a visual representation of the notes 120 in the collaboration space.

In some embodiments, at least some of the one or more notes 120 include a mark, which can facilitate the identification, recognition, and/or authentication of a note. In some embodiments, a mark includes at least one of a barcode, a color block, a color code, a fiduciary mark, a trademark logo, a dot, a hole, and the like. The shape and/or color of the note itself may be used as the mark to facilitate the identification, recognition, and/or authentication of a note. In some cases, the mark can include a plurality of elements arranged in certain patterns, for example, fiduciary marks at four corners of a rectangular note. In some other cases, the mark can include a plurality of elements, where at least some elements are non-visible elements that can be used to provide authentication information, for example, RFID (radio frequency identification) tags. By way of example, a mark can be made using at least one of a retroreflective material, an optically variable ink, a colored ink, infrared absorbing ink, fluorescent ink, watermark, glossy material, iridescent material, multi-layer optical film, colloidal crystals, perforated marks, structured color, floating image, window thread, or the like. In some embodiments, the processing unit 110 first recognizes the mark on a note from a visual representation, determines the location of the mark on the visual representation, and then extracts the content of the note based on the recognized mark. In some cases, the processing unit 110 extracts the content of the note based upon the recognized mark, a known predetermined shape of the note, and/or a known relative position of the mark on the note. In some implementations, the processing unit 110 extracts the content of the note from the visual representation in real-time (i.e., process the data in a transitory storage) without storing the visual representation in a non-transitory storage.

In some implementations, the note recognition system 100A can include a presentation device (not shown in FIG. 4A) to show to a user which notes are recognized and/or which notes' content have been extracted. Further, the note recognition system 100A can present the extracted content via the presentation device. In some embodiments, the processing unit 110 can authenticate a note before extracting the content of the note. If the note is authenticated, the content will be extracted and stored in the note content repository 140. In some cases, the processing unit can extract the authentication information from the mark on the note. In such cases, the authentication information can be visible or non-visible on the mark. For example, the mark on a note can include a symbol, for example, a company logo, a matrix code, a bar-code, a color code, or the like. As another example, the mark on the note can include a tag to store information that can be retrieved by a suitable reader. For example, the mark can include a RFID tag, a near field communication (NFC) tag, or the like.

In some embodiments, the sensor 130 can generate a first visual representation of a scene having several notes 120, for example, taking a photograph or a video clip of the notes with the surrounding environment. Each of the notes has a mark. The processing unit 110 identifies the marks, determines the location of the marks, and uses the location of the marks to control the sensor 130 to generate a second visual representation of the scene having the notes 120, for example, taking a zoomed-in image of the notes. The processing unit 110 can further recognize and extract content of notes from the second visual representation.

Figure 4B:
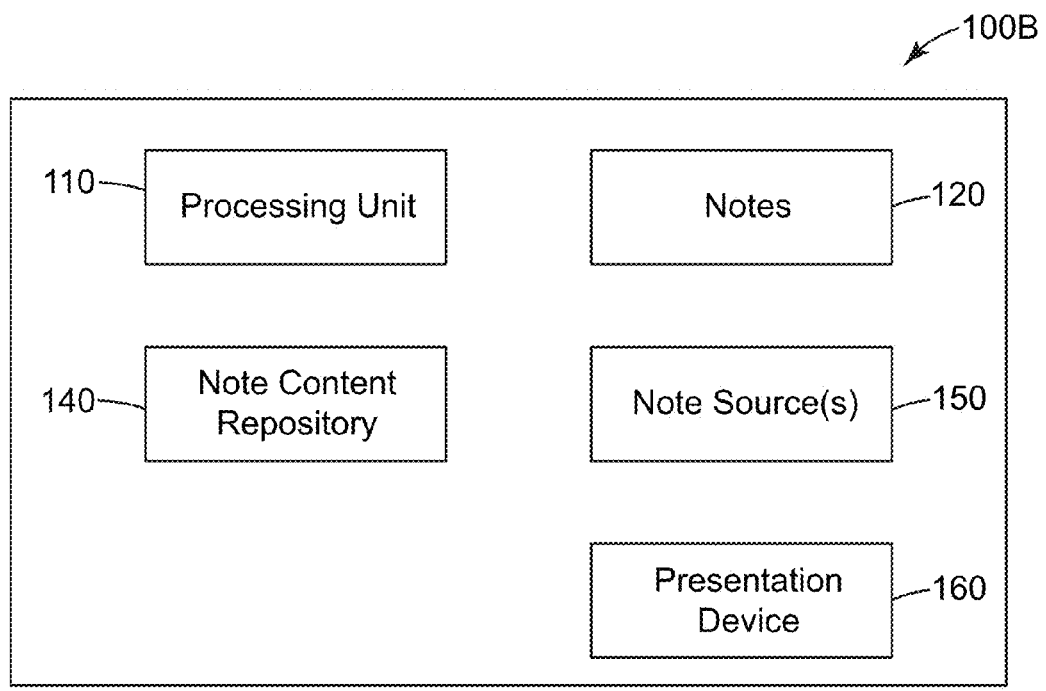
FIG. 4B illustrates an embodiment of a note management system.

FIG. 4B illustrates an embodiment of a note management system 100B. In this embodiment, the note management system 100B includes processing unit 110, one or more notes 120, one or more note sources 150, and a note content repository 140. In some cases, the system 100B includes a presentation device 160. The processing unit 110, the notes 120, and the note content repository 140 are similar to the components for the note recognition system 100A as illustrated in FIG. 4A. The note sources 150 can include sources to provide content of physical notes, such as a visual representation of a scene having one or more notes, and sources to provide content of digital notes, such as a data stream entered from a keyboard. In some embodiments, the note management system 100B includes a first source and a second source, and the first source is a visual representation of a scene having one or more notes 120. The first source and the second source are produced by different devices. The second source includes at least one of a text stream, an image, a video, a file, and a data entry. The processing unit 110 recognizes at least one of the notes from the first source and extracts the content of the note, as discussed in the note recognition system 100A. In some cases, the processing unit 110 labels the note with a category. The processing unit 110 can label a note based on its specific shape, color, content, and/or other information of the note. For example, each group of note can have a different color (e.g., red, green, yellow, etc.). In some cases, a note 120 can include mark that has one or more elements and the processing unit 110 can label the note based on information extracted from the mark.

In some embodiments, the note management system 100B can include one or more presentation devices 160 to show the content of the notes 120 to the user. The presentation device 160 can include, but not limited to, an electronically addressable display, such as a liquid crystal display (LCD), a tablet computer, a projector, an electronic billboard, a cellular phone, a laptop, or the like. In some implementations, the processing unit 110 generates the content to display on the presentation device 160 for the notes in a variety of formats, for example, a list, grouped in rows and/or column, a flow diagram, or the like.

Various components of the note recognition system and note management system, such as processing unit, image sensor, and note content repository, can communicate via a communication interface. The communication interface includes, but not limited to, any wired or wireless short-range and long-range communication interfaces. The short-range communication interfaces may be, for example, local area network (LAN), interfaces conforming to a known communications standard, such as Bluetooth standard, IEEE 802 standards (e.g., IEEE 802.11), a ZigBee or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 5A:
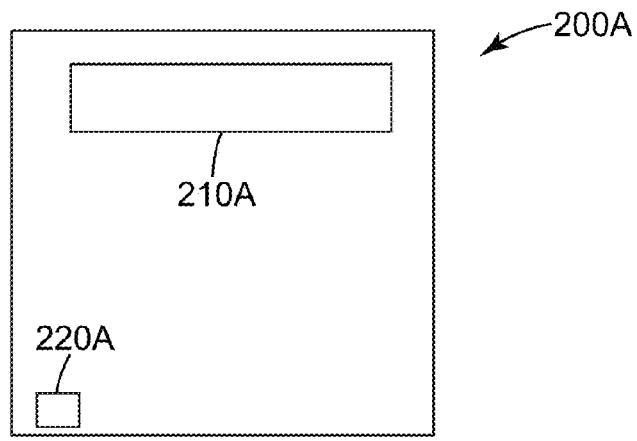
FIGS. 5A-5D illustrate some examples of notes having marks.
Figure 5B:
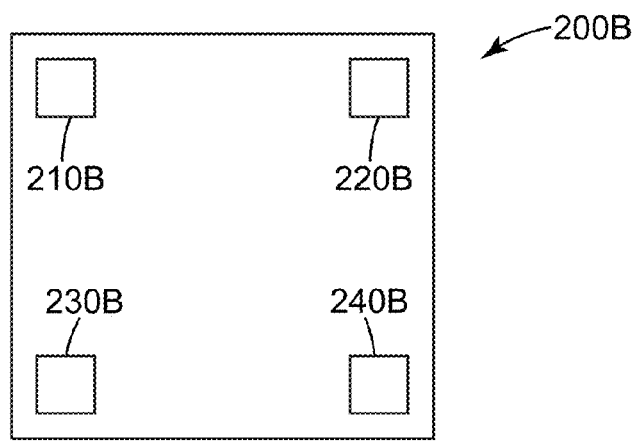
Figure 5C:
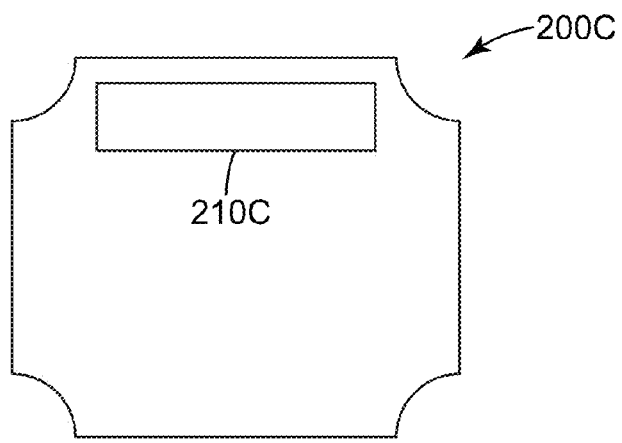

FIGS. 5A-5C illustrate some examples of notes having marks affixed thereon. As illustrated in FIG. 5A, the mark on the note 200A has two elements, element 210A and element 220A. The elements 210A and 220A can have different size, shape, relative position and/or material composition. For example, element 210A is a barcode as an identifier for the note and element 220A is a small rectangle of retro-reflective ink that can be used to determine the boundary of the note. As illustrated in FIG. 5B, the mark on the note 200B can have four elements 210B, 220B, 230B, and 240B. The four elements may have similar or different sizes, shapes, and material compositions. The mark can be used to recognize the size, location, orientation, distortion, and other characteristics of the note, which can be used in content extraction and enhancement. As illustrated in FIG. 5C, the mark on the note 200C has one element 210C. The note 200C has a non-rectangular shape. In some embodiments, the element 210C includes an identifier, for example, to identify the types and the grouping for a note. In some cases, the identifier is a unique identifier.

Figure 5D:
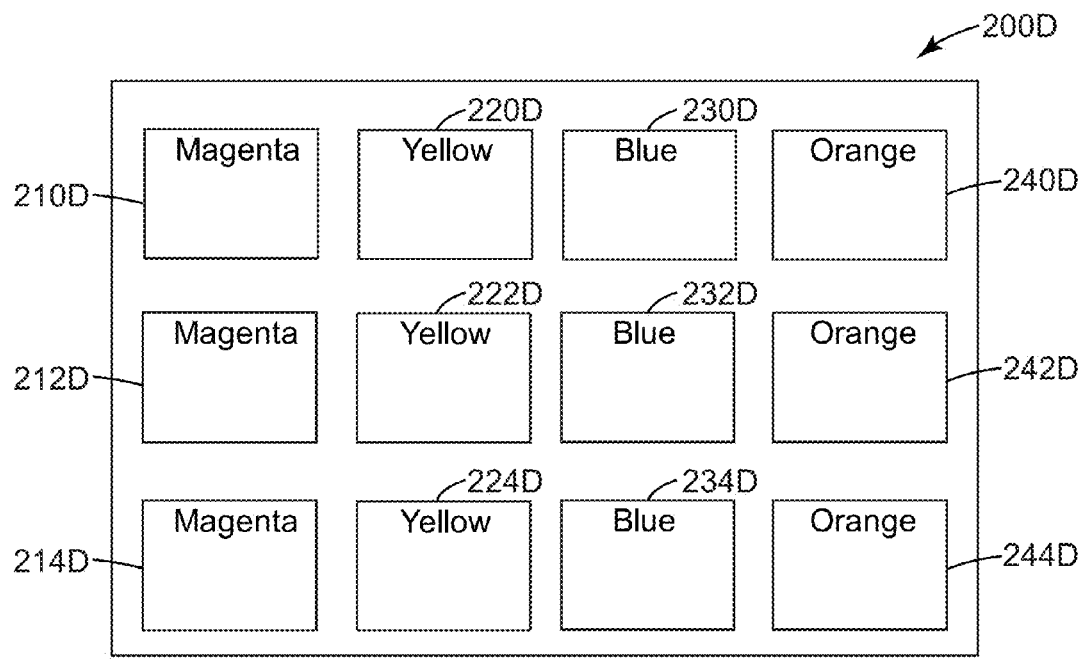

FIG. 5D illustrates another example of notes having marks. The marks are the color of the notes. An image 200D capturing twelve notes is illustrated in FIG. 5D. Notes 210D, 212D, and 214D are magenta. Notes 220D, 222D, and 224D are yellow. Notes 230D, 232D, and 234D are blue. Notes 240D, 242D, and 244D are orange.

Figures 5E, 5F:
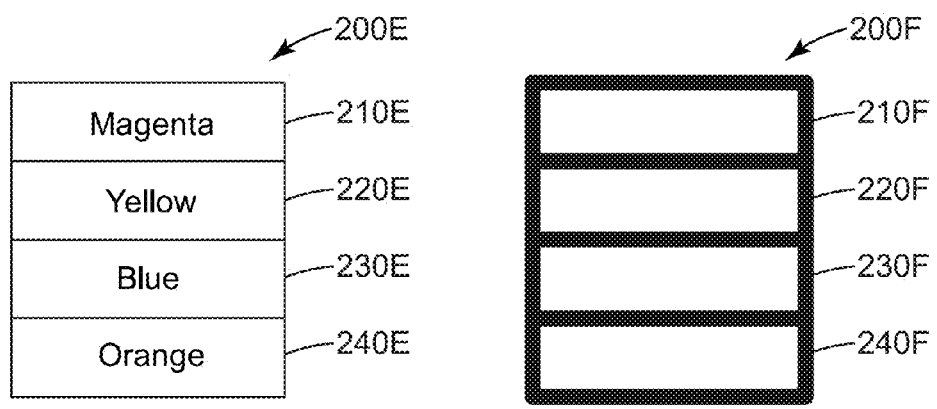
FIGS. 5E-5F illustrate some examples of notes with segments.

FIGS. 5E and 5F illustrate some examples of notes with segments. FIG. 5E illustrates a note 200E with four colored segments. Each segment has a solid color. For example, segment 210E is magenta; segment 220E is yellow; segment 230E is blue; and segment 240E is orange. FIG. 5F illustrates a note 200F with four segments and each segment has a colored boundary. For example, segment 210F has a magenta boundary; segment 220F has a yellow boundary; segment 230F has a blue boundary; and segment 240F has an orange boundary. In some implementations, the colored boundary has certain line width (e.g., more than 0.1 mm, more than 2% of the overall width of the segment, etc.) such that the boundary can be recognized by an image processing algorithm. In some cases, the color of the segment or the boundary of the segment can be used to categorize the segment. For example, magenta segments or segments with magenta boundary may be associated with a category A and yellow segments or segments with yellow-colored boundary may be associated with a category B. In some other cases, the color of the segment or the boundary of the segment can be used to denote a status or other functional information regard the note. For example, red may denote deletion of the note content; and orange may denote note to be completed.

Figure 5G:
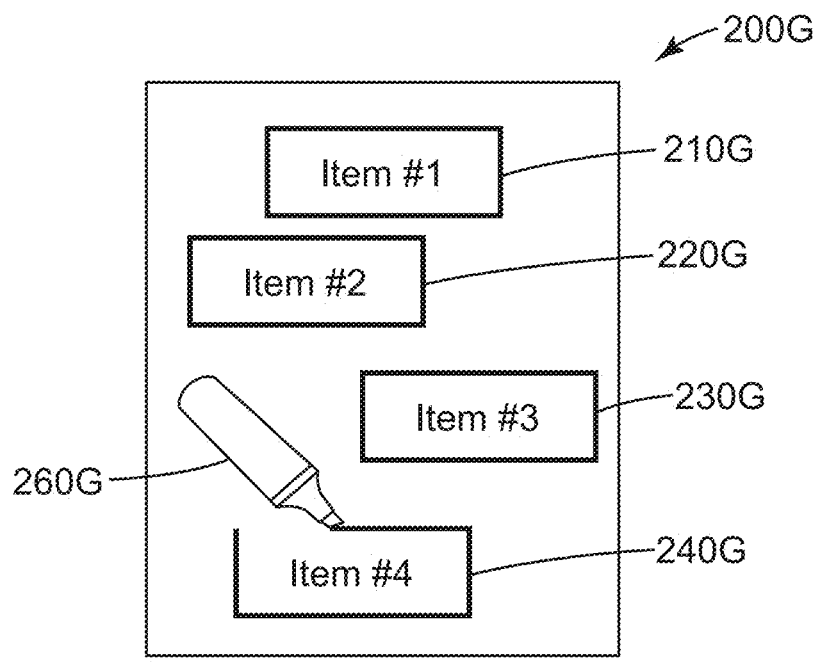
FIG. 5G illustrates an example of creating segments of a note using marks.
Figure 5H:
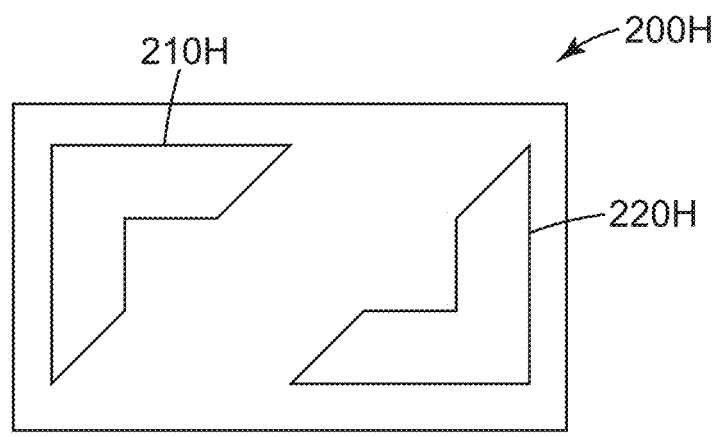
FIG. 5H illustrates an example of marks.

FIG. 5G illustrates an example of creating segments of a note using marks. The note 200G can be any media with content, for example, a printed document, a white board having writing and/or drawing, a piece of paper with handwritten notes, or the like. The marks can be generated using a pen (i.e., the pen or highlighter 260G illustrated in FIG. 5G), printed marks, flags, stickers, colored tapes, highlighter, colored paper, printed flags with handwritten content, or the like. The note 200G has four segments, 210G, 220G, 230G, and 240G, where each of the segments has a rectangular mark. In some implementations, a segment can be marked at two opposing corners, such as top left corner and bottom right corner. As illustrated in FIG. 5H, the corner marks can be of predetermined shapes of known sizes that are affixed to the physical note, as shown as 210H and 220H. For example, a user may affix marks 210H, 220H to the corners of a physical note or to bracket an area within a larger note (e.g., note 200G) where the bracketed region is to be considered a separate region (segment) from which to extract content. The marks 210H and 220H are elbow-shaped and symmetric. Marks can include, but not limited to, one or more of lines, arrows, star-shaped marks, elbow-shaped marks, rectangular marks, circular marks, ellipse-shaped marks, polygon-shaped marks, and geometric-shaped marks. In some embodiments, marks used for a corner can be in any geometric shapes, for example, rectangle, circle, star, or the like. In addition, marks can have asymmetric elbow-like shapes.

Figure 6A:
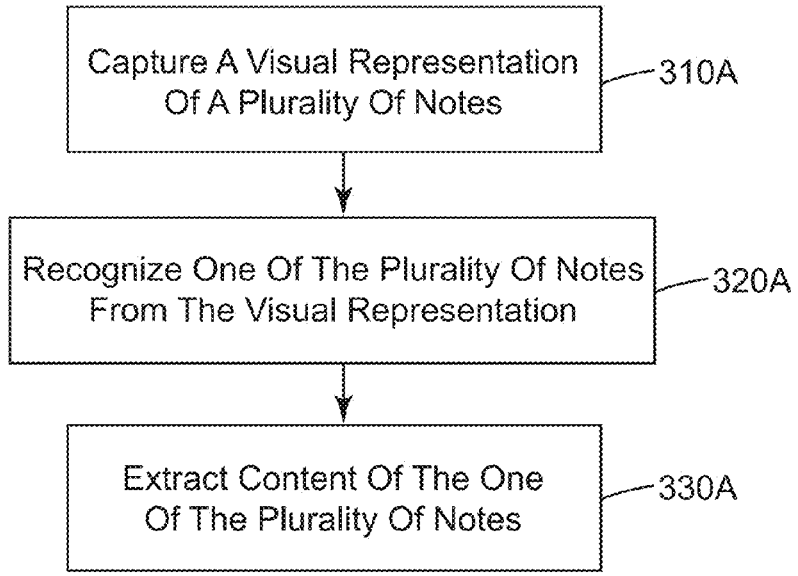
FIG. 6A illustrates a flow diagram of an embodiment of a note recognition and/or management system.

FIG. 6A illustrates a flow diagram of an embodiment of a note recognition and/or management system, such as note management application 78 of mobile device 15 (FIG. 1) or note recognition system 100A (FIG. 4A). Initially, the system captures a visual representation of plurality of notes (step 310A). In some embodiments, the notes are physical notes and it is more efficient to capture more than one note at a time. Next, the system recognizes one or more of the plurality of notes from the visual representation (step 320A). For example, the system can recognize a specific mark on a note and subsequently determine the general boundary of the note. The system extracts content of the one or more of the plurality of notes (step 330A). At this time, the system may create a respective digital note representative of a corresponding one of the recognized physical notes. The system may associate the content extracted from the visual representation for a given physical note with the corresponding digital note representative of the physical note. In some embodiments, the system can apply image transformation to at least part of the visual representation before extracting content. In some other embodiments, the system can apply image enhancement or other image processing technique to improve the quality of the extracted content. In yet other embodiments, the system can further recognize text and figures from the extracted content.

Figure 6B:
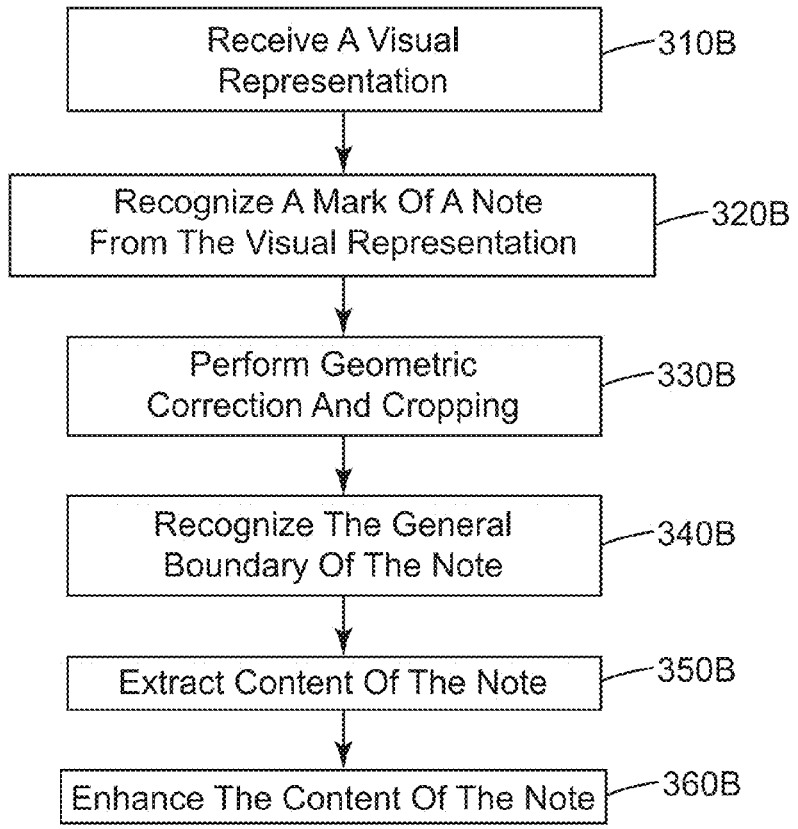
FIG. 6B illustrates a flow diagram of an embodiment of extracting content of notes.

FIG. 6B illustrates a flow diagram of an embodiment of extracting content of notes. First, a visual representation is received by the system (step 310B). The system recognizes a mark on a note from the visual representation (step 320B). After the position and/or shape of the mark is determined, the system may optionally perform geometric correction and cropping to the visual representation (step 330B). Based on the recognized position and/or shape of the mark on the note, the general boundary of the note is recognized on the visual presentation (step 340B). In some embodiments, the system may receive two visual representations of the same set of notes, where each of the notes has a mark. The first visual representation is taken using a light source suitable to capture the marks on the notes. For example, the light source can be infrared light for marks using infrared sensitive ink. The marks are recognized in the first visual representation and the positions of the marks are determined. The second visual representation can capture the set of notes and the system can determine the general boundary of each note based on its mark respectively. For example, the marks can be made with retro-reflective materials and the first visual representation can be captured with a separate light source (e.g., flash, etc.) and the second visual representation can be captured without a separate light source. After the general boundary of a note is determined, the system extracts the content of the note (step 350B). At this time, the system may create a respective digital note representative of a corresponding one of the recognized physical notes. The system may associate the content extracted from the visual representation for a given physical note with the corresponding digital note representative of the physical note. As another example, where the visual representation is an image, the system may crop the image according to the determined general boundary of the note. Optionally, the system may enhance the content of the note (step 360B), for example, by changing the contrast, brightness, and/or using other image processing techniques (e.g., white balancing, contrast stretching, etc.). In some cases, the system may update the note with a status indicating its content extracted.

Figure 6C:
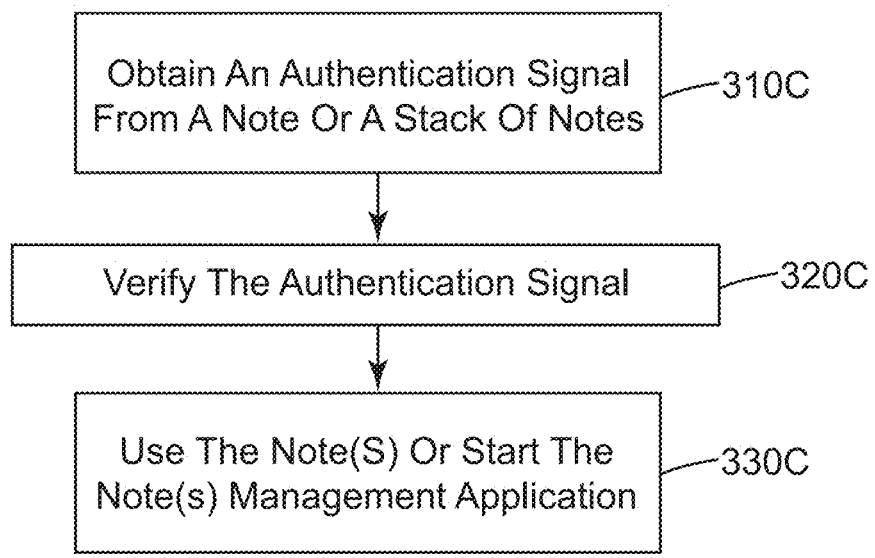
FIG. 6C illustrates a flow diagram of an embodiment of authenticating a note.

FIG. 6C illustrates a flow diagram of an embodiment of authenticating a note. First, obtain an authentication signal from a note or a stack of notes (step 310C). In one embodiment, the authentication information is a visual component (e.g., a hologram) of a mark on a note and the authentication signal can be obtained by extracting the visual component from a visual representation capturing the note. In another embodiment, the authentication information is contained in an electronic component (e.g., a RFID tag) of a mark on a note and the authentication signal can be obtained using a suitable reader (e.g., a RFID reader). Next, the system verifies the authentication signal (step 320C). The system can start the note management application or use the note(s) if the note(s) are authenticated (step 330C). In some cases, authentication can be done before capturing the notes.

Figure 6D:
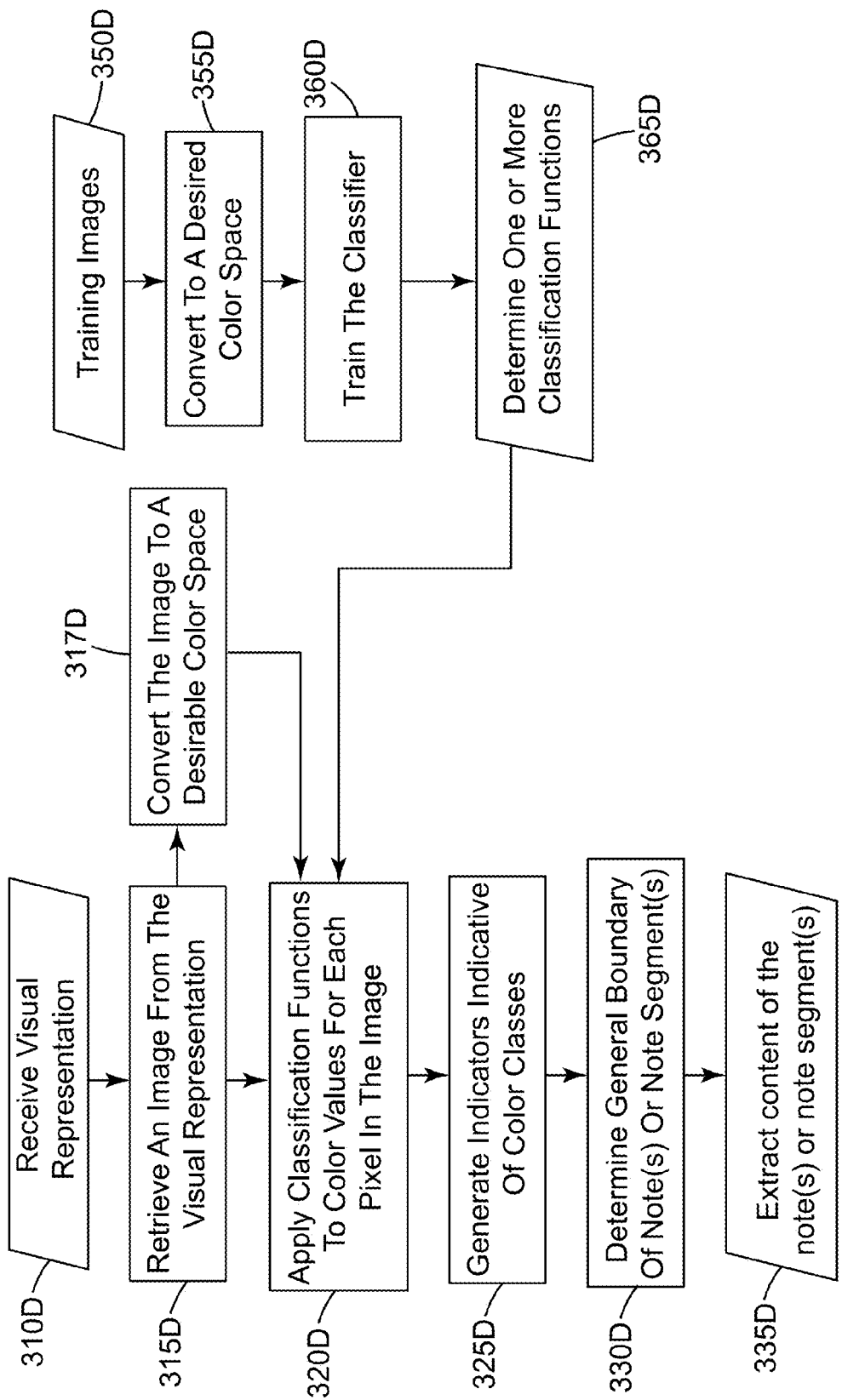
FIG. 6D illustrates a functional flow diagram of an embodiment of extracting content of notes or note segments using color classification algorithm.

FIG. 6D illustrates a functional flow diagram of an embodiment of extracting content of notes or note segments using color classification algorithms. One or more steps in the flow diagram are optional, for example, the training steps for computing classification function(s), also referred to as classifier, (step 350D-365D) are not necessary if the classification function(s) are provided. Initially, image data of capturing a visual representation of note(s) or a note with note segment(s) (step 310D) within or without the surrounding environment is received. In some cases, an image is retrieved from the visual representation (image data) (step 315D) if the visual representation is not a single image. For example, the visual representation is a set of images, and the image retrieved is an aggregation of at least part of the set of images. As another example, the visual representation is a video, and the image retrieved is a combination of several or all frames of the video. Another optional step is to convert the image to a desirable color space (step 317D). The applicable color space includes, but not limited to, RGB (red, green, and blue), LAB (e.g., Hunter 1948 L,a,b color space, CIE 1976 (L*, a*, b*) color space), CMYK (cyan, magenta, yellow, and key (black)), HSV (hue, saturation, and value), HSL (hue, saturation, and lightness), HSI (hue, saturation, and intensity), sRGB (standard red, green, and blue) color space. Next, apply one or more classification functions to color values for each pixel or group of pixels in the image (step 320D). The classification functions can be computed using the training steps 350D-365D. The classification algorithms can be, for example, linear discriminant analysis, quadratic classifier, Gaussian Mixture Models, Boosted Decision Trees, Support Vector Machines or the like.

Some classifiers are generative in nature while others are discriminative. In general, generative classifiers generate an individual model for each class (in our case a color) and a queried pixel/group of pixels value is given a probability score as to whether it belongs to that class or not. Discriminative classifiers on the other hand model the boundary between two or more classes (2-class and multiclass classification respectively). Generative models provide easier generalizability to new classes (colors) that are not already modeled while separate discriminative models have to be retrained to every existing class (colors). Many examples of generative and discriminative classifiers are described in Christopher M. Bishop, 2006, Pattern Recognition and Machine Learning (Information Science and Statistics), Springer-Verlag New York, Inc., Secaucus, N.J., USA, the entire content of which is incorporated herein by reference. Some examples of generative models are naïve Bayes classifier, Gaussian Mixture Models and other probabilistic Bayesian models using Gaussian or other priors, and Dictionary Learning, such as those described in Michal Aharon, Michael Elad, and Alfred Bruckstein (2006), "K-SVD: An Algorithm for Designing Overcomplete Dictionaries for Sparse Representation", IEEE Transactions on Signal Processing 54 (11): 4311-4322), the entire content of which is incorporated herein by reference. Some examples of discriminative classification models are neural networks, Support Vector Machines, Decision Trees, Linear and Quadratic discriminate classification, logistic regression. Other example classification methods are neither generative nor discriminative e.g. nearest neighbor classification algorithm. In addition, the performance of any of the above mentioned classification models can be improved by ensemble learning algorithms that combine multiple instances of classification models mentioned above. Ensemble learning may be implemented as Bagging, Boosting, and their variants.

Using the classification algorithms, indicators indicative of color classes for each pixel or group of pixels is generated in the image based on color values of the pixel or group of pixels (step 325D). A color class includes a particular range of wavelength or can be an "other" color class referring to any other color besides the color classes of interest. For example, a color class can be magenta, yellow, blue, orange, etc. An indicator can be represented by, for example, a number, a code, a symbol, an alphanumerical token, a color value, a grayscale value, or the like.

Based on the indicators, the general boundary of note(s) or note segment(s) can be determined (step 330D). In one embodiment, the adjacent pixels with a same indicator are grouped into a region and the boundary of the region can be determined. In some cases, the indicators are further processed using image processing principles, for example, noise filtering, morphological opening, or the like, before the general boundary is determined. In some embodiments, the shape and/or the size of a note or note segment is predetermined, e.g., predefined at the time the note was manufactured, which can be used to determine and/or filter the general boundary of note(s) or note segment(s). At this time, the system may create a respective digital note representative for each of the physical notes for which a boundary is determined.

Using the general boundaries, the content of the note(s) or note segment(s) can be extracted (step 335D). The system may associate the content extracted from the visual representation for a given physical note with the corresponding digital note representative of the physical note. In some embodiments, the note(s) or note segment(s) may have colored boundaries or colored mark(s) at one or more locations instead of having solid color. In such embodiments, a same color classification algorithm can be used to identify the boundaries or marks and further extract the content of the note(s) or note segment(s). In some cases, a set of content, where each piece of content corresponds to a note or a note segment, can be presented to user via a graphical interface or in a report. In some implementations, the set of content can be grouped with categories, where each category is associated with a color, a shape, a size, or a combination thereof used in the note. For example, notes 210D, 212D and 214D illustrated in FIG. 5D are associated with a category A and notes 220D, 222D, and 224D are associated with a category B. As another example, a note segment with boundary of magenta (e.g., note segment 210F illustrated in FIG. 5F) is associated with category A and a note segment with boundary of yellow (e.g., note segment 220F illustrated in FIG. 5F) is associated with category B.

In some cases, the generated indicators only indicate whether the pixel's or groups of pixels' color value is a particular color class. For example, an indicator of 1 indicates the pixel or group of pixels is yellow and an indicator of 0 indicates the pixel is not yellow. In such cases, a set of indicators will be generated for each color class of interest. In some embodiment, steps 320D-335D are repeated for each color class of interest, for example, magenta, yellow, blue, and orange.

In some embodiments, the classification functions can be determined using the steps illustrated in FIG. 6D. First, a set of training images are provided (step 350D). In some cases, the training images can include notes or note segments with the same color classes of interest. The training images can be captured under one or more lighting conditions and/or one or more different cameras. For example, the training images can be a set of six images captured in three lighting conditions using two different cameras. The training images are optionally converted to a desired color space (step 355D). Train the classifier (step 360D) using the known color for corresponding color values of a pixel or group of pixels, for example using equations (1)-(4) as discussed below. The set of classification function(s) for color class is then computed (step 365D). In some cases, a set of classification function(s) for only one color class is obtained using steps 350D-365D.

These steps are repeated to obtain classification functions for each of other color classes of interest.

Figure 6E:
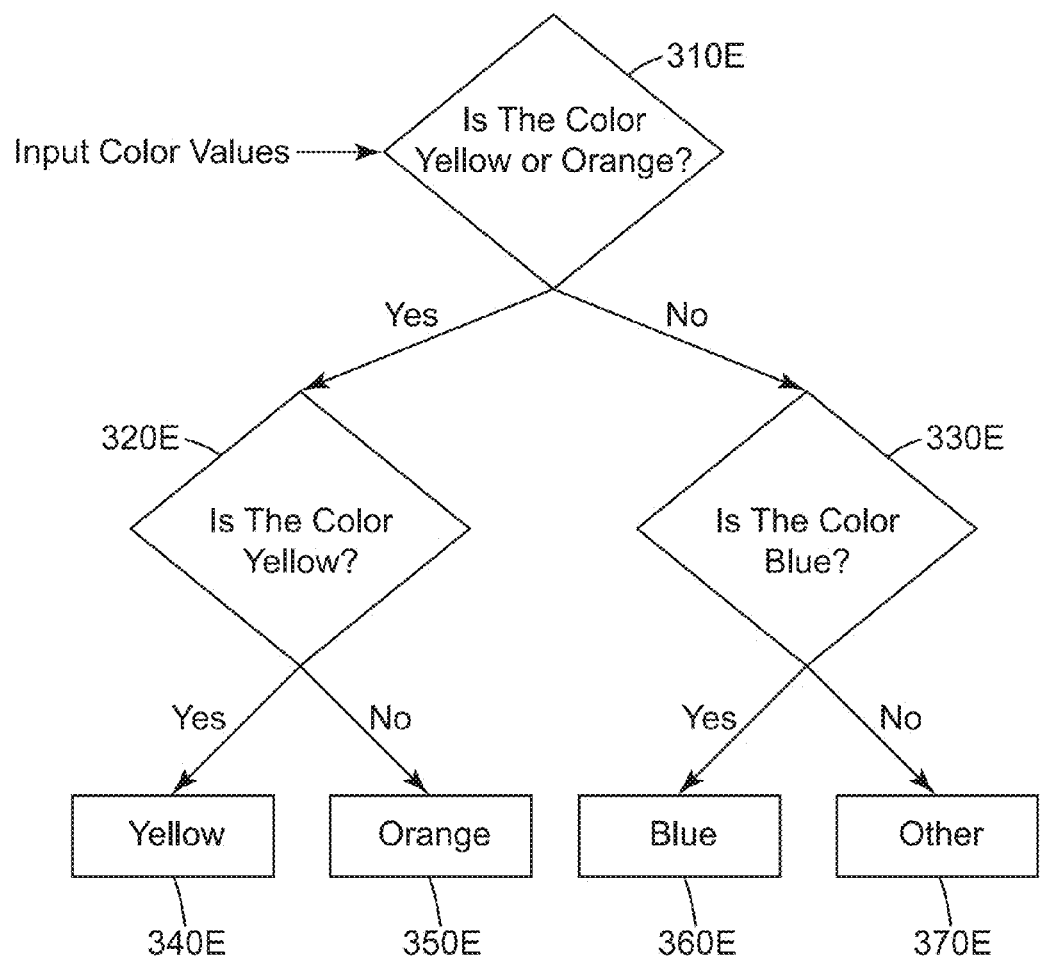
FIG. 6E illustrates a functional flow diagram of an example of extracting content of notes or note segments having three different colors using color classification algorithm.

In some embodiments, a color class can include two or more similar colors. The classification function for such a color class can be obtained using the same process as discussed above. In some cases, a hierarchical approach may be used for extracting notes or note segments having more than two colors, as illustrated in FIG. 6E. FIG. 6E illustrates a functional flow diagram of an example of extracting content of notes or note segments having three different colors (yellow, orange, and blue) using color classification algorithm. Initially, the system uses a color classification algorithm to determine whether a pixel has a color that belongs to a color class including yellow and orange (step 310E). If the color is yellow or orange, the system further evaluates whether the color is yellow (step 320E): if it is yellow, an indicator for yellow can be associated with the pixel or group of pixels (step 340E); and if it is not yellow, an indicator for orange can be associated with the pixel or group of pixels (step 350E). If the color does not belong to the color class including yellow and orange, the system evaluates whether the color is blue (step 330E) using the color classification algorithm: if the color is blue, an indicator for blue can be associated with the pixel or group of pixels (step 360E); and if the color is not blue, an indicator of other color can be associated with the pixel or group of pixels (step 370E).

In one embodiment, an image of captured notes or note segments can be converted into LAB color space. The LAB color space separates different colors on the ab plane, and it is possible to differentiate different color in this color space using a threshold approach. Table 1 lists the pseudo code to an example of extracting notes or note segments using a threshold approach.

TABLE 1

Pseudo Code for Simple Color "b" Threshold

Load an image (from a file or using other methods)
Convert to Lab color space
If (b value > 75% maximum b value)
grayscaleResult = 255
else
grayscaleResult = 0
Morphological erode grayscaleResult 2 passes
Median filter grayscaleResult
Morphological dilate grayscaleResult 2 passes
Find contours of all regions with same grayscaleResult
Eliminate small regions (less than 1% of total image size)
Extract notes or note segments While the above pseudocode and description explains a two class linear discriminate classification process, there are multiclass extensions of the same, such as those described in Christopher M. Bishop. 2006. Pattern Recognition and Machine Learning (Information Science and Statistics). Springer-Verlag New York, Inc., Secaucus, N.J., USA., incorporated herein by reference.

In some cases, the threshold approach may not be adaptive to various capture conditions, such as variation of colors, lighting, camera type, ambience, etc. To address this issue, adaptive models can be used, which can learn the best representations for different colors that are robust to various capture conditions and additional colored notes. One such model is the Fischer's Linear Discriminant model or Fischer's Linear Discriminant Classifier, as described by Mika, S.; Ratsch, G.; Weston, J.; Scholkopf, B.; Muller, K., *Fisher discriminant analysis with kernels*, Neural Networks for Signal Processing IX, 1999, Proceedings of the 1999 IEEE Signal Processing Society Workshop., pages 41-48, August 1999.

Given a set of m observations X (i.e., the training images), where each observation is 3 dimensional in this case (L, a and b values for the LAB color space) and the corresponding color class for all observations Y, a weight vector w is to be determined such that $$w \cdot X + c < 0 \text{ if } Y=1 \text{ (belongs to the color class of interest), and} \quad (1)$$

$$w \cdot X + c >= 0 \text{ if } Y=0 \text{ (does not belong to color class of interest)}, \quad (2)$$

where w·X is a dot product operation and c are off-set values. The weights w depends on the mean values of L, a, and b of each color class and the covariance matrix of each color class. Specifically, the weight w maximizes S, where $$S = \sigma^2_{between\text{-}class} / \sigma^2_{within\text{-}class} \quad (3)$$

i.e., w is learned such that the between-class variance is maximized and within-class variance is minimized.

This results in a $w = (\Sigma_{y=0} + \Sigma_{y=1})^{-1}(\mu_{y=1} - \mu_{y=0})$ (4)

The class mean and covariance ($\mu$ and $\Sigma$) can be estimated from the training image. If it is assumed that the class covariance are identical then the model is linear. If this assumption is not made, then the model is a quadratic discriminant classifier. The classification method for the quadratic discriminant classifier has an additional term:

$$X^T Q X + w X + c < 0 \text{ if } Y=1 \text{ (belong to class in question)} \quad (5)$$

$$X^T Q X + w X + c >= 0 \text{ if } Y=0 \text{ (does not belong to class in question)} \quad (6)$$

Figure 14:
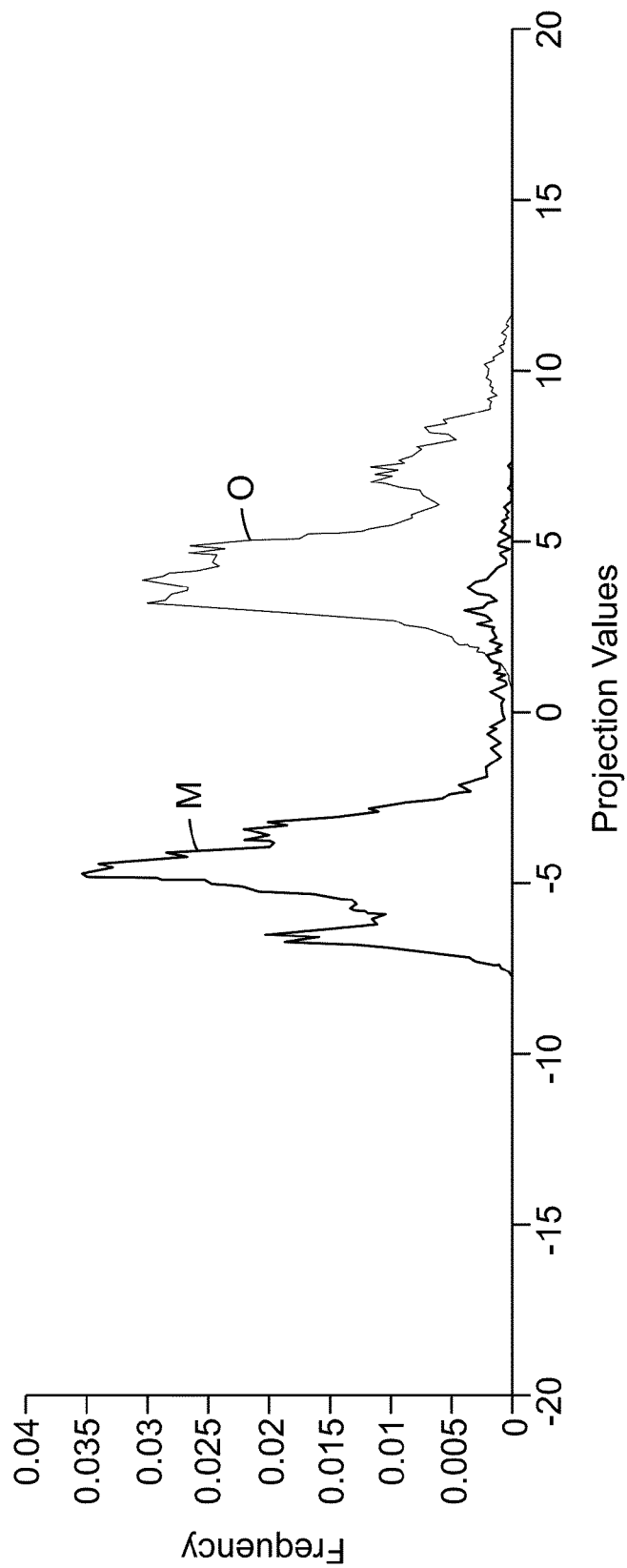
FIG. 14 illustrates a graph of classification values vs. colors.

For example, after the linear discriminant model is applied to an image having magenta notes and other background color, the resulting projections are scalar values and the distributions of the scalar projection values are shown in FIG. 14. The classifier can be further trained to recognize color in images captured in various conditions using the same process and equations. As an example, for a set of coefficients [w1 w2 w3 c] where w1, w2, and w3 are the coefficients corresponding to L, a, and b respectively and c is the offset, the coefficients for color class blue is [w1=0.05056 w2=0.34929 w3=0.4381 c=−106.71]; and the coefficients for color class yellow is [w1=0.0068796 w2=0.027731 w3=−0.14887 c=18.812].

Table 2 lists the pseudo code for an embodiment of using linear discriminant classifier and some examples of filtering steps. Here, Lcoeffecent, Acoefficient, Bcoefficient and offset correspond to w1, w2, w3 and c in the above example. The example of filtering assumes the notes are rectangular. Other color spaces such as RGB and HSV can follow similar approaches, and the pseudo code is listed in Table 3 and Table 4.

TABLE 2

Pseudo Code for Linear Discriminant Classifier (LDC) in LAB color space

Load RGB image (from file or other method)
Convert to LAB color space
LDC = L * Lcoefficient + A * Acoefficient + B * Bcoefficient + offset
If (LDC < 0.0)
    grayscaleResult = 255
else
    grayscaleResult = 0
Morphological erode grayscaleResult 5 passes
Median filter grayscaleResult
Morphological dilate grayscaleResult 5 passes TABLE 2-continued Pseudo Code for Linear Discriminant
Classifier (LDC) in LAB color space Find contours of all regions
Delete region contours for regions with an area less than a specified
percent of image area
Find best fit rotated rectangle of each remaining region
Delete region contours for regions with an area of less than 0.8 times the
area of the best fit
rotated rectangles found in the previous step
Extract notes or note segments A morphological opening process can be used to reduce noise, which includes morphological erosion followed by dilation. In some cases, the morphological erosion and dilation can use a structuring element which is disk shaped or circular. For example, the size of the structuring element is set at 5 by 5 for an image with a maximum dimension of 800 pixels. If the image is larger, the size of the structural element can be bigger. This type of noise reduction approach are described in *Image Analysis and Mathematical Morphology* by Jean Serra, ISBN 0-12-637240-3 (1982); *Image Analysis and Mathematical Morphology, Volume 2: Theoretical Advances* by Jean Serra, ISBN 0-12-637241-1 (1988); and *An Introduction to Morphological Image Processing* by Edward R. Dougherty, ISBN 0-8194-0845-X (1992).

TABLE 3

Pseudo Code for Linear Discriminant
Classifier (LDC) in RGB color space

Load RGB image (from file or other method)
LDC = R * Rcoefficient + G * Gcoefficient + B * Bcoefficient + offset
If (LDC < 0.0)
    grayscaleResult = 255
else
    grayscaleResult = 0
Morphological erode grayscaleResult 5 passes
Median filter grayscaleResult
Morphological dilate grayscaleResult 5 passes
Find contours of all regions
Delete region contours for regions with an area less than a specified
percent of image area
Extract notes or note segments

TABLE 4

Pseudo Code for Linear Discriminant
Classifier (LDC) in HSV color space

Figure 6F:
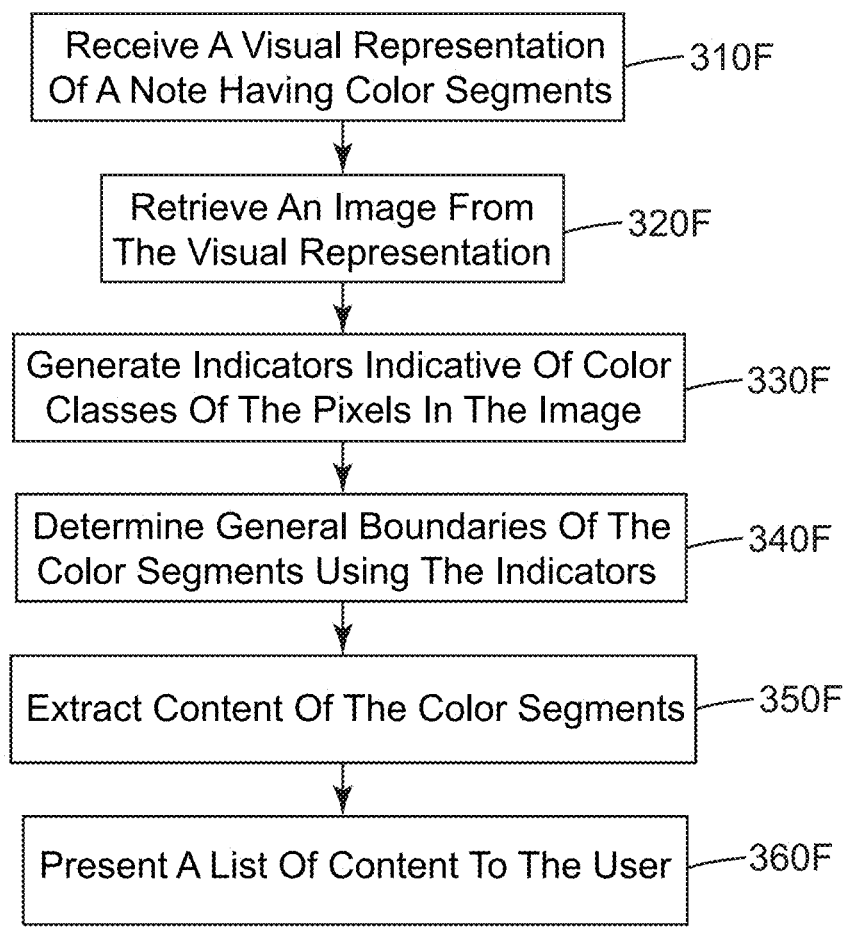
FIG. 6F illustrates a functional flow diagram of an embodiment of extracting a set of content from a note with segments.

Load RGB image (from file or other method)
Convert to HSV color space
LDC = H * Hcoefficient + S * Scoefficient + V * Vcoefficient + offset
If (LDC < 0.0)
    grayscaleResult = 255
else
    grayscaleResult = 0
Morphological erode grayscaleResult 5 passes
Median filter grayscaleResult
Morphological dilate grayscaleResult 5 passes
Find contours of all regions
Delete region contours for regions with an area less than a specified
percent of image area
Extract notes or note segments FIG. 6F illustrates a functional flow diagram of an embodiment of extracting a set of content from a note with segments. First, the system receives a visual representation of a note having a plurality of predefined color segments (step 310F). That is, image data capturing the visual representation may be received in which the physical note has been manufactured to have a plurality of different color segments. In some cases, an image from the visual representation (step 320F) may be retrieved, e.g., if the image data comprises video or a collection of a plurality of images. If the visual representation is an image, the image will be used for further processing. Next, indicators indicative of color classes of respective pixels or group of pixels are generated in the image (step 330F), using, for example, a color classification algorithm. Using the indicators, general boundaries of the color segments are determined (step 340F). Extract a set of content from the note segments (step 350F). In some cases, each piece of content is extracted from a corresponding note segment. Optionally, present a list of content to a user (step 360F). In some cases, a piece of content can be associated with a category. A note management system may use the color in the color segment to select the category for the piece of content. At this time, the system may create a respective digital note representative of a corresponding one of the recognized physical notes. As one example, the record may be created to contain a plurality of database fields, including fields for storing the particular content of each color segment of the physical note. The system may associate the content extracted from the visual representation for a given physical note with the corresponding digital note representative of the physical note. Moreover, the system may associate the content piece extracted from each color segment with the digital representation of each color segment. For example, the system may update the fields for the respective record within the database to store respective ones of the content pieces for the different color segments.

Figure 6G:
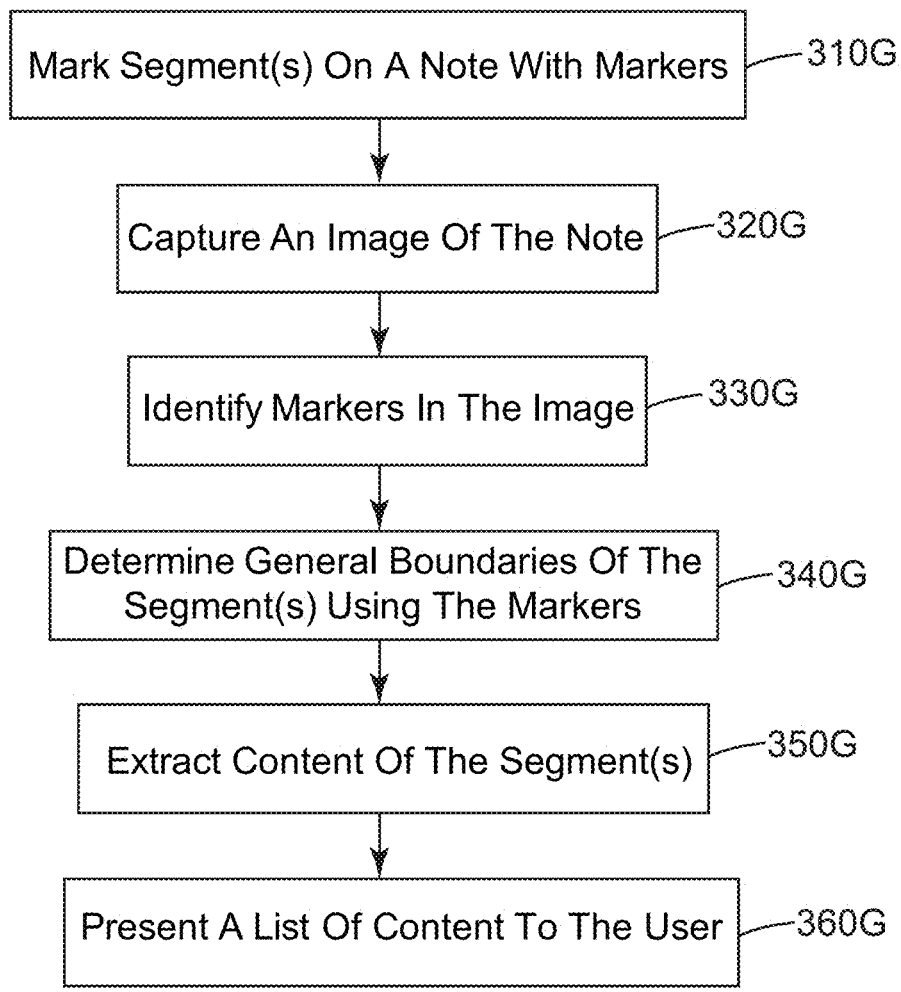
FIG. 6G illustrations a functional flow diagram of an embodiment of segmenting a note and extracting a set of content for the segments.

FIG. 6G illustrations a functional flow diagram of an embodiment of segmenting a note and extracting a set of content for the segments. First, a user may segment a note using marks (step 310G). The marks can be applied to one or more corners, along at least a part of the boundary of the segment. A note management system can capture an image of the note (step 320G). The system further identifies the marks in the image (step 330G). The general boundaries of the segments can be determined (step 340G). In some cases, some additional information, such as the relative positions of the marks, can be used to determine the general boundaries. Extract a set of content from the note segments using the determined boundaries (step 350G). In some cases, each piece of content is extracted from a corresponding note segment. Optionally, present a list of content to a user (step 360G). At this time, the system may create a respective digital note representative of a corresponding one of the recognized physical notes. As one example, the record may be created to contain a plurality of database fields, including fields for storing the particular content of each color segment of the physical note. The system may associate the content extracted from the visual representation for a given physical note with the corresponding digital note representative of the physical note. Moreover, the system may associate the content piece extracted from each color segment with the digital representation of each color segment. For example, the system may update the fields for the respective record within the database to store respective ones of the content pieces for the different color segments.

Figure 7A:
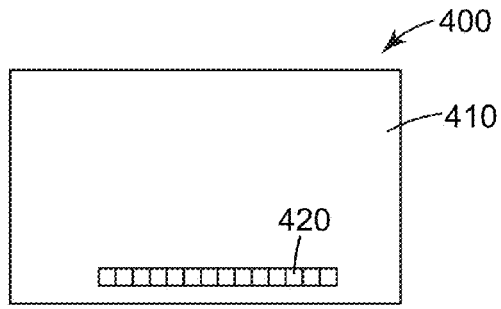
FIGS. 7A-7D illustrate an example of content extraction process of a note with a mark.
Figure 7B:
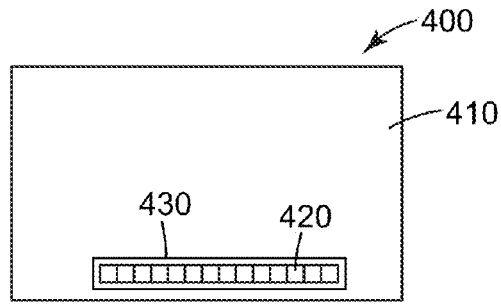
Figure 7C:
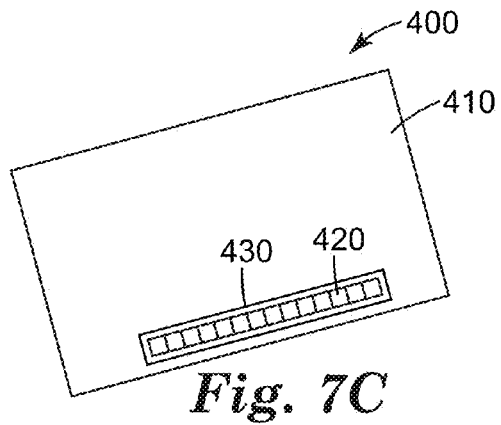
Figure 7D:
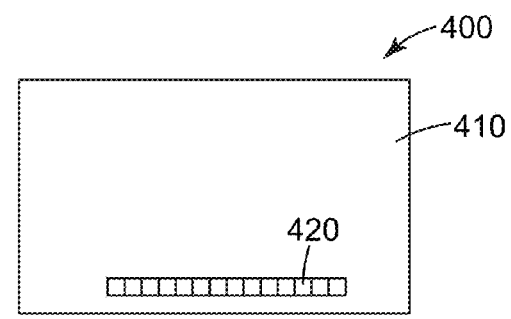

FIGS. 7A-7D illustrate an example of content extraction process of a note with a mark. First, as illustrated in FIG. 7A, a visual representation 400 of a note 410 is captured. The note 410 has a mark 420, which can be a barcode, a color code, a matrix code, a color block, or the like. Next, as illustrated in FIG. 7B, the system determines the general boundary 430 of the mark on the visual representation and recognizes the mark 420. In some cases, the note 410 may be slanted in the visual representation 400, as illustrated in FIG. 7C. In some other cases, the visual representation 400 may be taken with geometric distortion. The system may use the determined general boundary of the mark 420 or a portion of the mark 420 to determine the necessary image transformation and correction to the visual representation 400 to obtain the note content. FIG. 7D illustrates that the system extracts the content of the note 410 after the previous analysis and/or image processing.

Figure 8A:
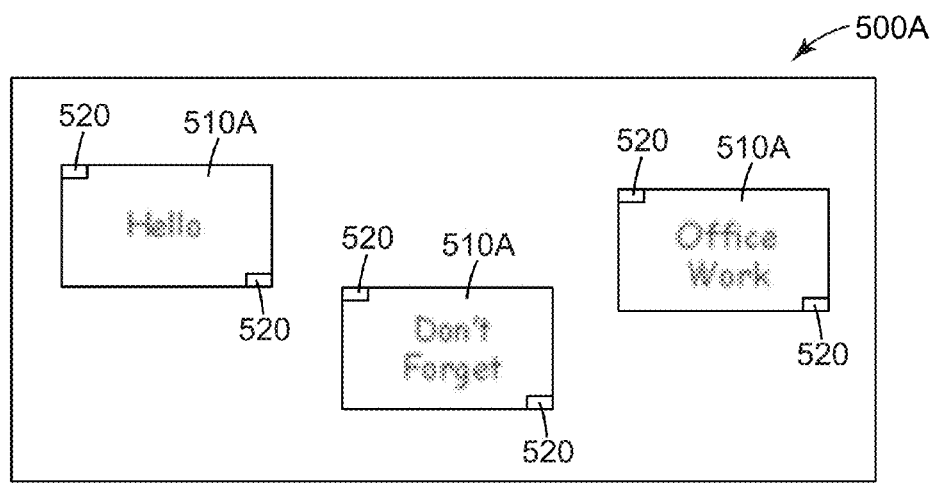
FIGS. 8A-8D illustrate an embodiment of content extraction of a plurality of notes with retroreflective marks.
Figure 8B:
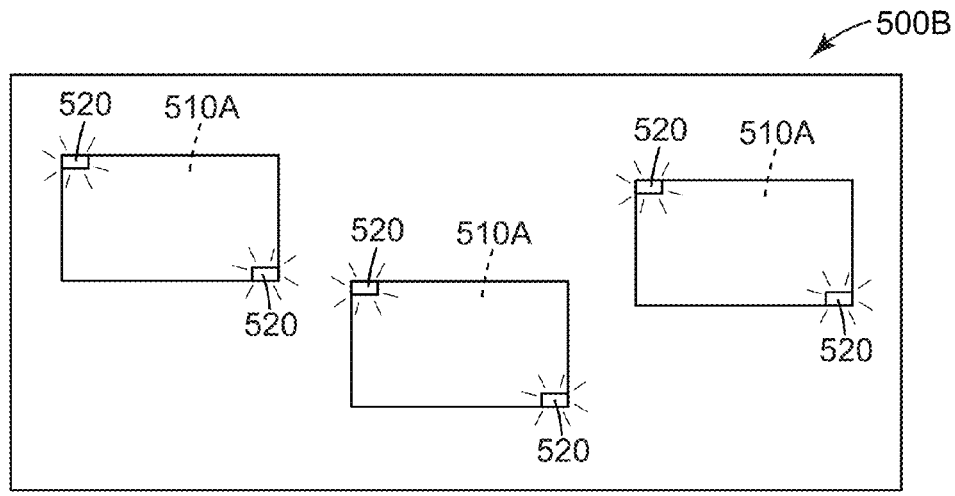
Figure 8C:
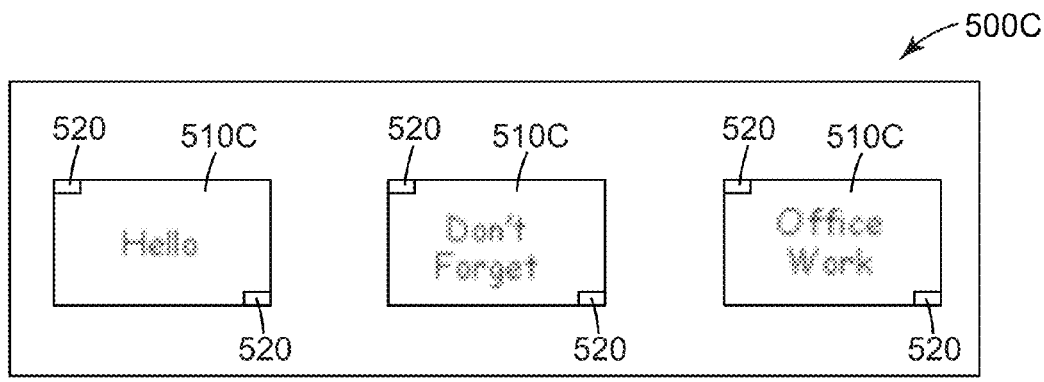
Figure 8D:
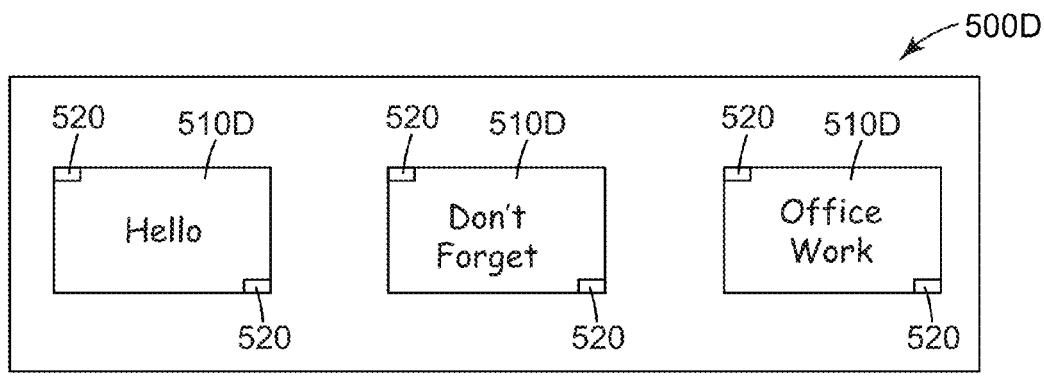

FIGS. 8A-8D illustrate an embodiment of content extraction of a plurality of notes with retroreflective marks. A note recognition/management system receives a visual representation 500A, which captures three notes 510A, and each note 510A has a mark 520 having two elements—two retroreflective rectangular tags at upper left and lower bottom corners. Because of the optical property of the retroreflective material, the mark 520 is substantially brighter than the rest of the note. FIG. 8B illustrates the marks 520 are much brighter than the notes 510A and the background. In some embodiments, the system may use image processing to transform the visual representation of 500A as illustrated in FIG. 8A to 500B as illustrated in FIG. 8B. In some alternative embodiments, the system may generate another visual representation 500B of the three notes 510A with a different light source, for example, a flashlight. The system can easily identify the marks 520 from the visual representation 500B. After the marks 520 are identified, the system can extract the content of the notes 510C, as illustrated in FIG. 8C. In some cases, the system may use image processing techniques (e.g., adaptive histogram equalization) to enhance the extracted content 510D, as illustrated in FIG. 8D.

Figure 9:
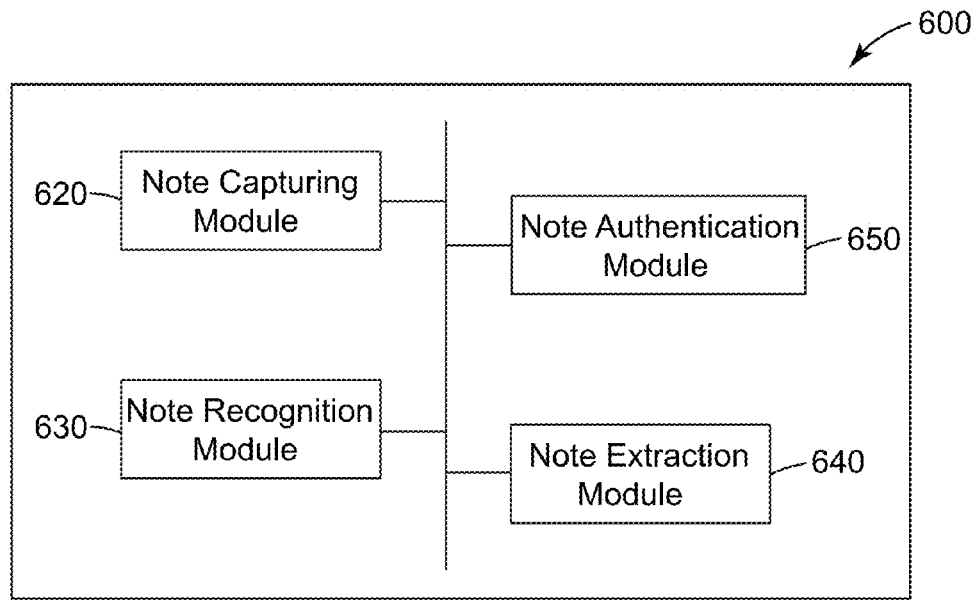
FIG. 9 illustrates a module diagram of an embodiment of a note recognition system.

FIG. 9 illustrates a module diagram of an embodiment of a note recognition system 600. In the embodiment as illustrated, the system 600 includes a note capturing module 620, a note recognition module 630, and a note extraction module 640. Various components of the note recognition system 600 can be implemented by one or more computing devices, including but not limited to, circuits, a computer, a processor, a processing unit, a microprocessor, and/or a tablet computer. In some cases, various components of the note recognition system 600 can be implemented on a shared computing device. Alternatively, a component of the system 600 can be implemented on multiple computing devices. In some implementations, various modules and components of the system 600 can be implemented as software, hardware, firmware, or a combination thereof. In some cases, various components of the note recognition system 600 can be implemented in software or firmware executed by a computing device. Additionally, various components of the system 600 can communicate via or be coupled to via a communication interface, for example, a wired or wireless interface. The note capturing module 620 is configured to capture a visual representation of a plurality of notes. In some embodiments, the note capturing module 620 includes an image sensor. The note recognition module 630 is coupled to the note capturing module 620, the note recognition module is configured to receive the captured visual representation and determine a general boundary of one of the plurality of notes from the captured visual representation. The note extraction module 640 is configured to extract content of the one of the plurality of notes from the captured visual representation based on the determined general boundary of the one of the plurality of notes.

In some embodiments, the note recognition system 600 includes a note authentication module 650 configured to authenticate the plurality of notes. In some cases, at least some of the plurality of notes have a mark. The mark can be used to facilitate the recognition, extraction and authentication of the note. For example, the note authentication module 650 can obtain an authentication signal from a mark of a note and verify the authentication based on the authentication signal. In some cases, the note authentication module 650 is coupled to the note recognition module 630 and provides the authentication information to the note recognition module 630. In some embodiments, the note recognition module 630 and the note extraction module 640 can perform the steps illustrated in FIG. 6B and in the relevant discussions.

In some embodiments, a note recognition/management system may use multiple recognition algorithms to recognize notes and extract notes' content, such as color recognition, shape recognition, and pattern recognition. For example, the system may use color spaces such as the RGB, HSV, CIELAB, etc. to identify regions of interest corresponding to the notes for color recognition. In some cases, the notes are further distinguished in their shape and due to the presence of unique patterns detected by shape recognition (e.g., Hough transform, shape context, etc.) and pattern recognition algorithms (e.g., Support Vector Machine, cross-correlation, template matching, etc.) respectively. These algorithms help filter out unwanted objects in the visual representation or other sources of notes' content and leave only those regions of interest corresponding to the notes.

In some embodiments, a note may include a mark made using fluorescent materials, such as printable inks or coatable dyes. For example, a fiducial mark such as a logo can be printed in fluorescent ink on the writing surface of a note. An appropriate light source would excite the fluorescent material. For example, a white LED (light emitting diode) of a mobile handheld device may be able to excite the fluorophore using the significant blue wavelength component of the LED output spectrum. In one embodiment, a fluorescent dye can be coated on the writing surface of the notes or included in the materials making the notes. In this embodiment, the fluorescent dye can provide not only verification of a branded product, but can also improve the contrast between the written information on the note and the background of the note itself. Such a mark can facilitate the recognition and segmentation of notes on a visual representation produced by an image sensor. In the cases of notes made from paper with fluorescent dye, the captured visual representation may have better readability. Depending on the excitation wavelength range and the fluorescing wavelength range for the fluorescent materials, additional optical equipment, such as a filter, may be used together with an image sensor (e.g., a camera) to improve detection.

Figure 10A:
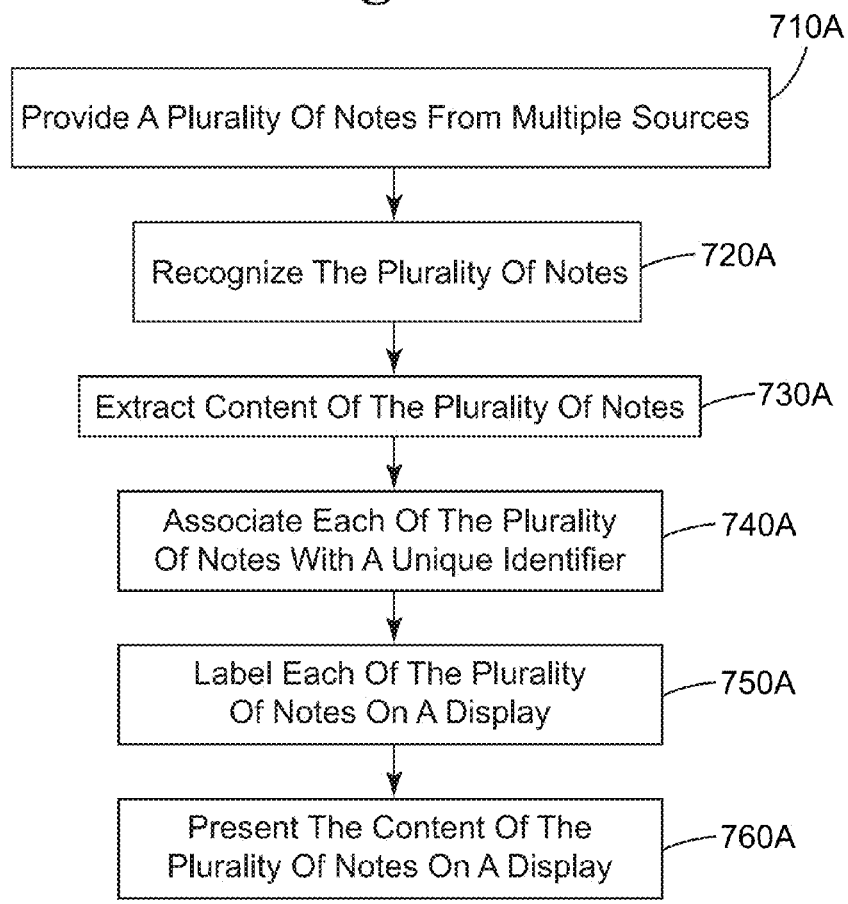
FIG. 10A illustrates a flow diagram of an embodiment of a note management system.

FIG. 10A illustrates a flow diagram of an embodiment of a note management system. First, the system receives a plurality of notes from multiple sources (step 710A). For example, the note management system may receive a set of images of a number of notes from a camera or a smart phone and receive another set of images of a number of notes taken from a remote location. As another example, the note management system may receive a visual representation (e.g., a video) of a number of notes taken by a video recording device and a text stream of notes that is entered via a laptop. In some embodiments, the multiple sources are sources of notes' content taken from different devices, for example, cameras, scanners, computers, etc. Then, the system recognizes one of the plurality of notes (step 720A). The system extracts content of the plurality of notes (step 730A). In some embodiments, some notes include marks (e.g., color block, color code, barcode, etc.) on the note and one source of notes is a visual representation of some of the notes. In some cases, the recognizing step includes recognizing marks on the notes from the visual representation and then determines the general boundaries of the notes based on the recognized marks. In some of these cases, the extracting step includes extracting the content based upon the recognized marks, known shapes of the notes, and known relative positions of the marks on the notes. After the content of the plurality of notes is extracted, in some cases, the system may associate each of the plurality of notes with a unique identifier (step 740A). The system may label each of the plurality of notes with a category (step 750A). The labeling step is discussed in more details below. Additionally, the system may first authenticate the notes before recognizing the notes. Optionally, the system may present the content of the plurality of notes on a display (step 760A). In some embodiments, the system may present the extracted content of the plurality of notes with an output field indicating the categories of the notes. In some implementations, the system may use the category information of the notes in presenting the notes (e.g., show the notes in one category in a group).

Figure 10B:
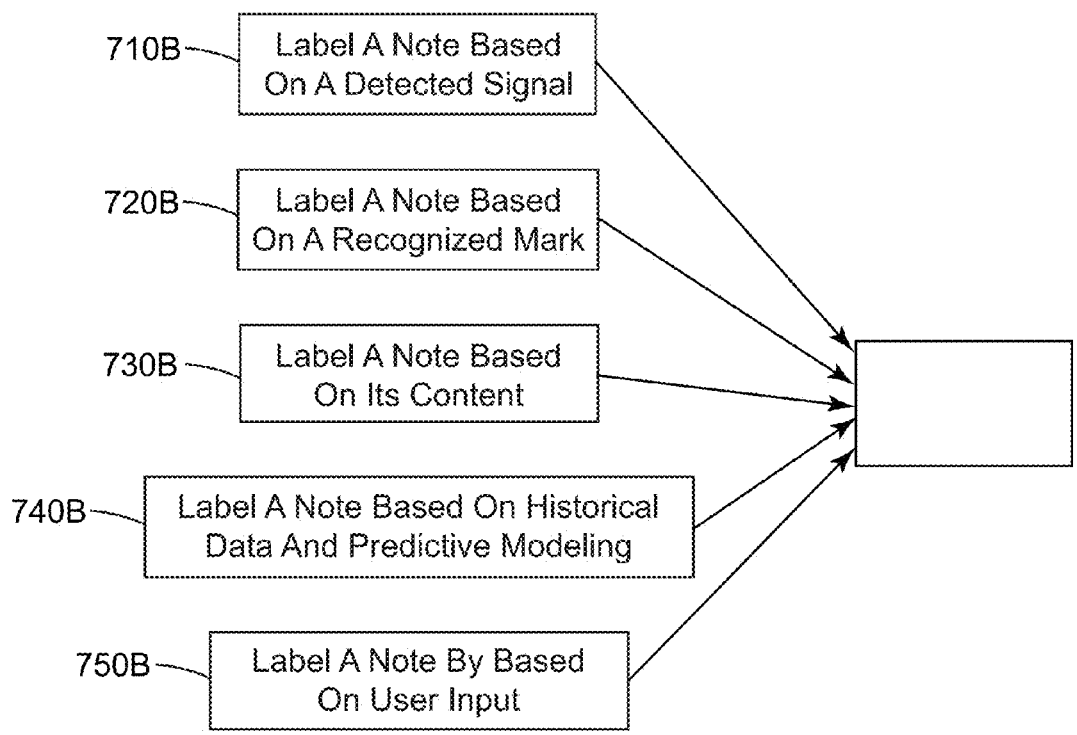
FIG. 10B illustrates examples of how a system may label a note.

FIG. 10B illustrates examples of how a system may label a note. In one embodiment, a note management system can label a note based on a detected signal (710B). For example, a note can have a mark including a barcode; the system can read the barcode and label the note based on the barcode. In some cases, the system can label a note based on a recognized mark (720B). For example, the mark can include an icon, logo, a colored block, or other graphical symbol indicating a particular group. The system may further label a note based on its content (730B). In some cases, the system may label a noted based on historical data and/or predictive modeling (740B). In some other cases, the system may label a note by user input (750B). A note management system can use one or more approaches to label a note. The system may also use other approaches to label a note that are not listed in FIG. 10B, for example, label a note based on the shape of the note. Further, in some cases, a note may be associated with more than one category.

Figure 11:
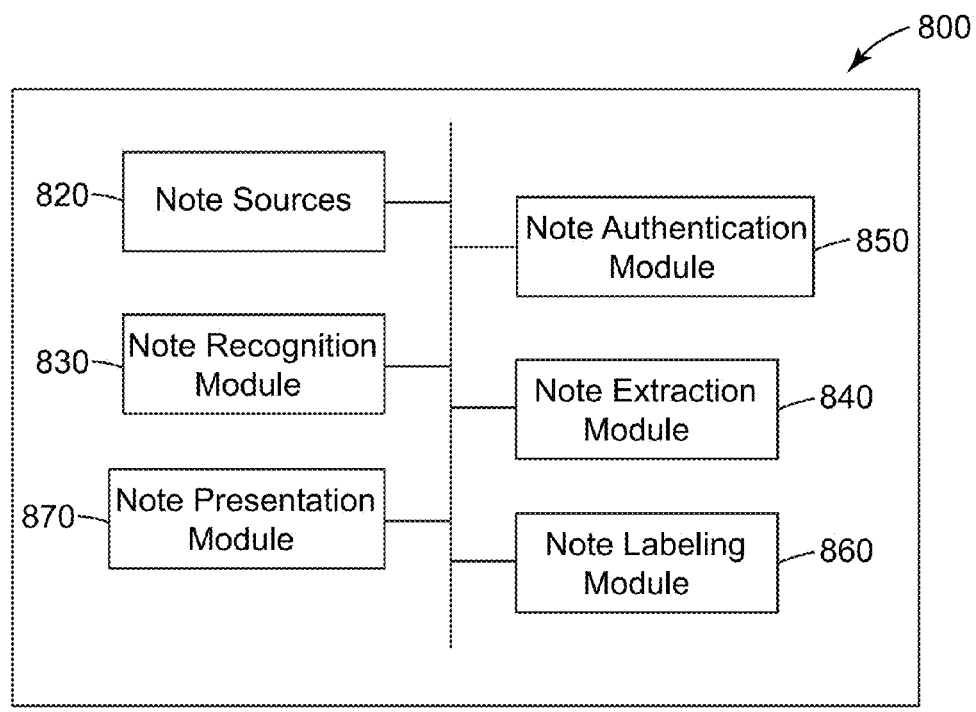
FIG. 11 illustrates a module diagram of an embodiment of a note management system.

FIG. 11 illustrates a module diagram of a note management system 800. In the embodiment as illustrated, the system 800 includes one or more note sources 820, a note recognition module 830, a note extraction module 840, and a note labeling module 860. Various components of the note management system 800 can be implemented by one or more computing devices, including but not limited to, circuits, a computer, a processor, a processing unit, a microprocessor, and/or a tablet computer. In some cases, various components of the note management system 800 can be implemented on a shared computing device. Alternatively, a component of the system 800 can be implemented on multiple computing devices. In some implementations, various modules and components of the system 800 can be implemented as software, hardware, firmware, or a combination thereof. In some cases, various components of the note management system 800 can be implemented in software or firmware executed by a computing device. Additionally, various components of the system 800 can communicate via or be coupled to via a communication interface, for example, a wired or wireless interface. The note source(s) 820 is configured to provide a plurality of notes. In some embodiments, one of the note sources 820 is a visual representation of a scene having one or more notes. In some cases, the note sources 820 include a plurality of different sources for providing notes, for example, images, text stream, video stream, or the like. The note recognition module 830 is coupled to the note sources 820, the note recognition module 830 is configured to receive the visual representation and determine a general boundary of a note from the visual representation. The note extraction module 840 is configured to extract content of the one of the plurality of notes from the visual representation based on the determined general boundary of the one of the plurality of notes. The note labeling module 860 is configured to label the one of the plurality of notes with a category.

In some embodiments, the note management system 800 includes a note authentication module 850 that is configured to authenticate the plurality of notes. In some cases, at least some of the plurality of notes have a mark. The mark can be used to facilitate the recognition, extraction and authentication of the note. For example, the note authentication module 850 can obtain an authentication signal from a mark of a note and verify the authentication based on the authentication signal. In some cases, the note authentication module 850 is coupled to the note recognition module 830 and provides the authentication information to the note recognition module 830. In some embodiments, the note recognition module 830 and the note extraction module 840 can perform the steps illustrated in FIG. 6B and in the relevant discussions. In some embodiments, the note labeling module 860 can use one or more labeling approaches illustrated in FIG. 10B and in the relevant discussions. In some cases, a note may be associated with more than one category.

In some embodiments, the note management system 800 may include a note presentation module 870, which is configured to gather content of the plurality of notes and present at least part of the plurality of notes according to the category of the notes. For example, the note presentation module 870 can organize the plurality of notes into groups that have the same category. As another example, the note presentation module 870 can add connection lines and/or arrows of different groups of notes.

Figure 12A:
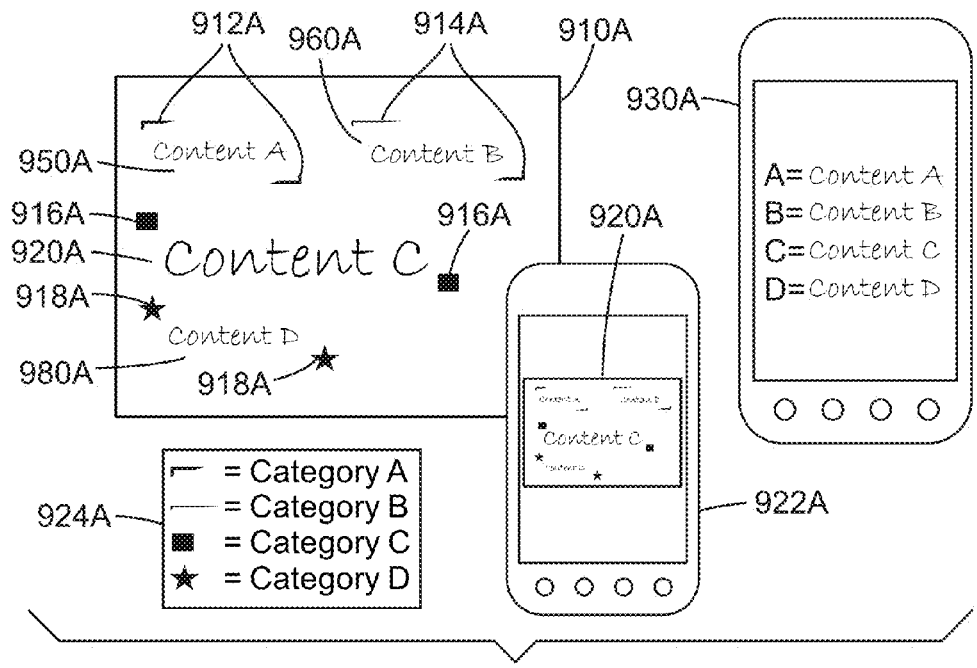
FIG. 12A illustrates an example of content extraction process of a segmented note with marks.

FIG. 12A illustrates an example of content extraction process of a segmented note with marks. A visual representation 920A of a note 910A is captured by an imaging device (e.g., a smart phone 922A). The note 910A is segmented into four sections using four set of marks, 912A, 914A, 916A, and 918A. Each of the four segments has a corresponding content, Content A 950A, Content B 960A, Content C 970A, and Content D 980A. The computing device can use any of the note extraction approach to extract the note content and present to a user, as illustrated in 930A. In addition, a category can be associated with a specific mark having a known geometric shape and/or size, as illustrated as 924A. Using the category association, the pieces of content, Content A-D, are associated with a category as shown in 930A.

Figure 12B:
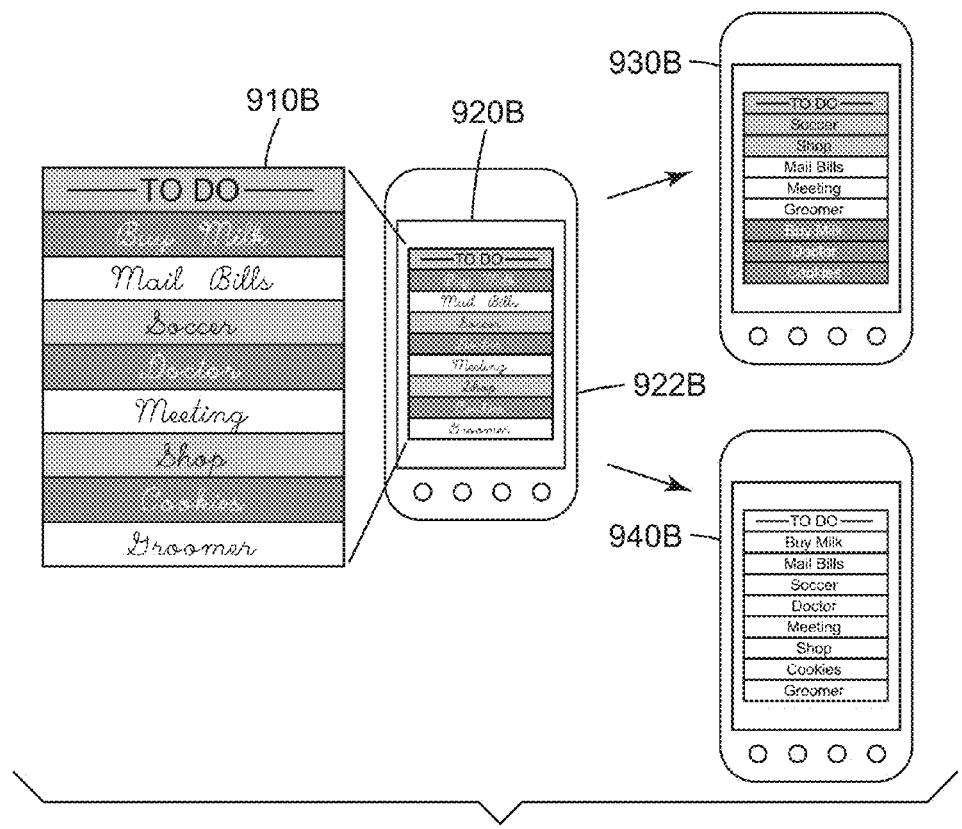
FIG. 12B illustrates an example of content extraction process of a note with color segments.

FIG. 12B illustrates an example of content extraction process of a note 910B with color segments. 920B is a visual representation of the note 910B captured by an image sensor, for example, a smart phone 922B. A set of content 940B, each piece of content corresponding to a segment, are extracted using any of the note extraction process as described above. In addition, a piece of content can be associated with a category depending on the color of the color segments, and the list of content presented to a user can be grouped by the categories, as illustrated in 930B.

Figure 12C:
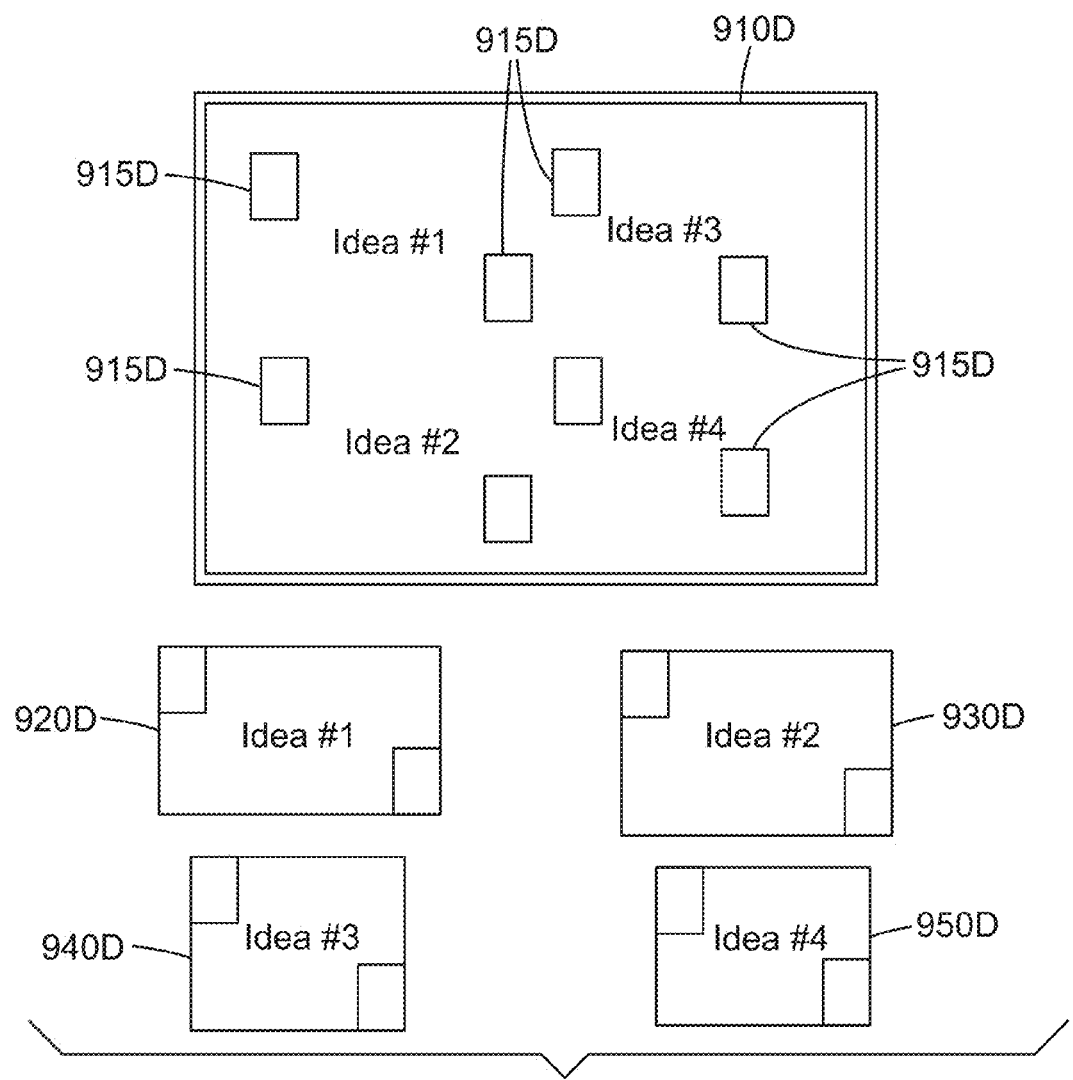
FIG. 12C illustrates an exemplary scenario of marking a white board to extract segmented content.

FIG. 12C illustrates an exemplary scenario of marking a board 910D to extract segmented content. Marks 915D are attached to board 910D. In some cases, the relative positions (e.g, top left corner, bottom right corner) of the marks are known and used to extract content. The pieces of content 920D, 930D, 940D and 950D can be extracted using, for example, the pseudo code listed in Table 5, where the marks 915D are identified as bounding boxes.

TABLE 5

Pseudo Code for Extracting Content

Use color classification algorithm to identify bounding boxes and place in a collection
While
Search bounding box collection for bounding box with the minimum X value (left most)

TABLE 5-continued

Pseudo Code for Extracting Content

Search bounding box collection for bounding box that is to the right and lower than note found
in previous step (constraint is that note must be at least a defined distance to the right +X)
Used bounding boxes to define the region of information to be extracted
Discard both bounding boxes from collection
Notes left in collection This simple algorithm can be very effective in providing a method for extracting content from free flowing discussions on a board.

Figure 13A:
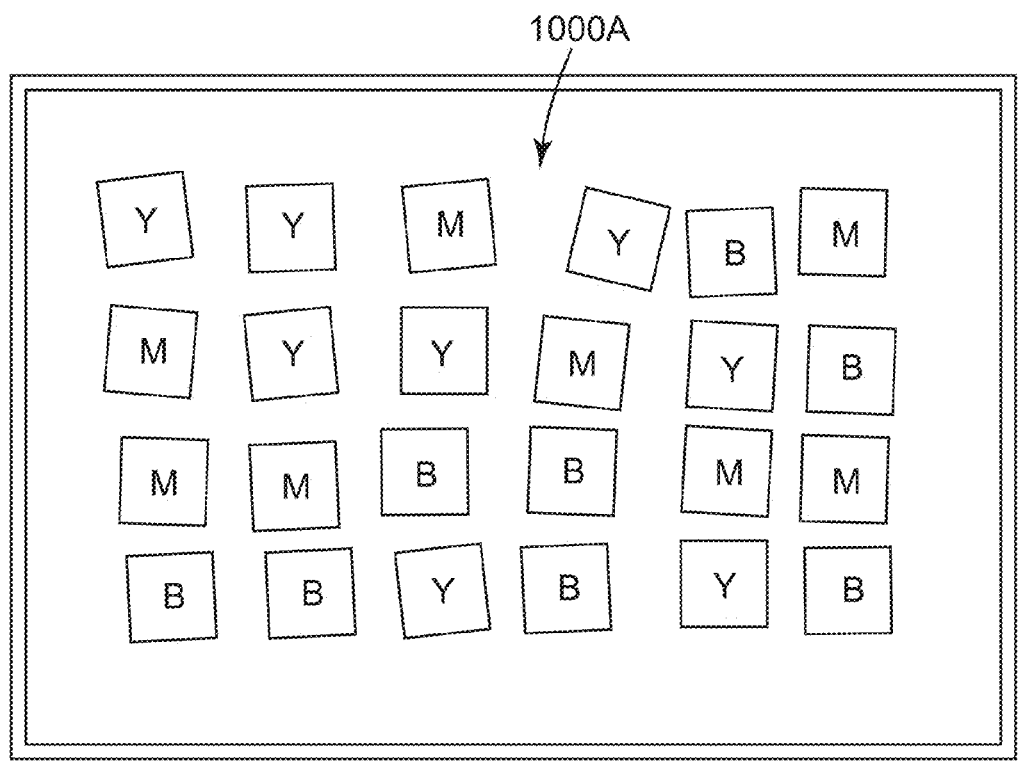
FIGS. 13A and 13B illustrate an example of extracting colored notes using color classification algorithm.
Figure 13B:
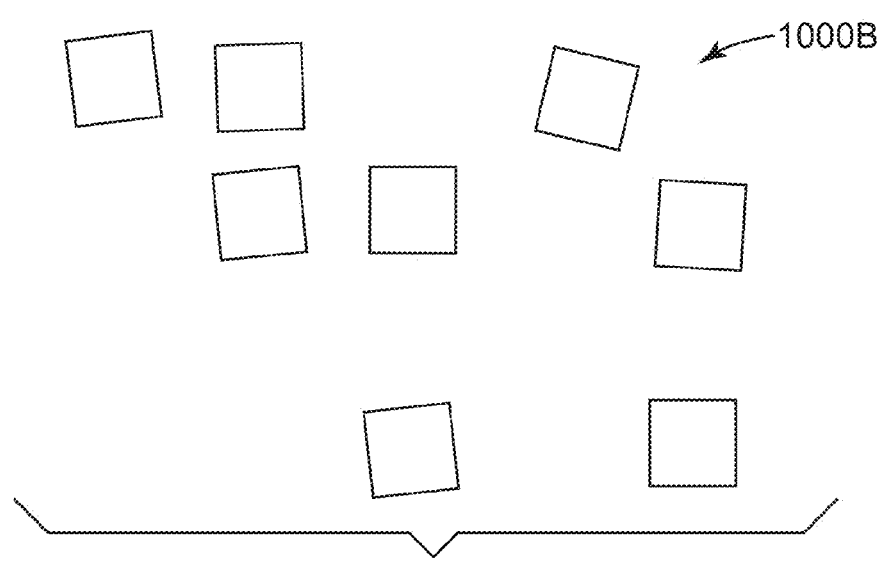

FIGS. 13A and 13B illustrate an example of extracting colored notes using color classification algorithms. FIG. 13A illustrates a visual representation 1000A of notes with different colors, where Y representing yellow, M representing magenta, and B representing blue. FIG. 13B represents extracting all yellow notes 1000B from the visual representation using, for example, the pseudo code listed in Table 2.

The present invention should not be considered limited to the particular examples and embodiments described above, as such embodiments are described in detail to facilitate explanation of various aspects of the invention. Rather the present invention should be understood to cover all aspects of the invention, including various modifications, equivalent processes, and alternative devices falling within the spirit and scope of the invention as defined by the appended claims and their equivalents.

What is claimed is:

1. A method of extracting content from a note with color segments using a computer system having one or more processors and memories, comprising:
   receiving, by the one or more processors, image data comprising a visual representation of a note having a plurality of predefined color segments, wherein at least two of the plurality of color segments are different in size;
   generating, by the one or more processors, a plurality of indicators, each indicator indicative of a color class of a respective pixel or group of pixels in the image data and based on color values of the pixel or group of pixels;
   based on the generated plurality of indicators, determining, by the one or more processors, general boundaries within the image data of the color segments; and
   extracting, by the one or more processors and from the image data, content comprising a set of multiple content pieces using the general boundaries, each of the content pieces corresponding to a different one of the color segments of the note.

2. The method of claim 1, wherein at least one of the color segments has a single color.

3. The method of claim 2, wherein at least two adjacent color segments have different colors.

4. The method of claim 1, further comprising:
   creating a digital note representative of the note for which the boundary is determined; and
   associating the content extracted from the image data with the digital note.

5. The method of claim 4,
   wherein creating a digital note comprises creating a respective record within a database to store attributes associated with the note for which the boundary is determined, the record having a plurality of fields for storing respective content; and
   wherein associating the content with the digital note comprises updating each of the fields for the respective record with the database to store respective ones of the content pieces for the different color segments.

6. The method of claim 1, wherein at least one of the color segments has a first color at the boundary of the color segment and a second color within the boundary of the color segment, the second color being different from the first color.

7. The method of claim 1, further comprising:
   categorizing, with the processor, each of the content pieces associated with a color of the corresponding color segment.

8. The method of claim 1, further comprising:
   categorizing, with the processor, each of the content pieces associated with a size of the corresponding color segment.

9. The method of claim 1, further comprising:
   labelling, with the processor, each of the content pieces with a status associated with a color of the corresponding color segment.

10. A note management system having one or more processors and memories, comprising:
    a note recognition module executing on the one or more processors and configured to receive image data capturing a note having a plurality of color segments, wherein at least two of the plurality of color segments are different in size,
    wherein the note recognition module is further configured to generate a plurality of indicators, each indicator indicative of a color class of a pixel or group of pixels within the image data and based on color values of the pixel or group of pixels; and
    a note extraction module executing on the one or more processors and configured to determine general boundaries of the color segments of the note based on the plurality of indicators and extract content using the general boundaries, the content comprising a plurality of content pieces, each of the content pieces corresponding to one of the color segments of the note.

11. The note management system of claim 10, wherein at least one of the color segments has a first color at the boundary of the color segment and a second color within the boundary of the color segment, the second color being different from the first color.

12. The note management system of claim 11, wherein the note extraction module categorizes each of the content pieces by the color at the boundary of the corresponding color segment.

13. The note management system of claim 10, wherein the note extraction module associates each of the content pieces with a category, wherein, when presenting the content, the note presentation module is further configured to group at least some of the content pieces in accordance with the associated categories.

14. The note management system of claim 10, wherein the note extraction module is further configured to group adjacent pixels having a same indicator and form a region.

15. The note management system of claim 10, wherein the note recognition module is further configured generate each of the indicators by applying a function to the color values of the respective pixel or group of pixels.

16. The note management system of claim 10, wherein the note extraction module is further configured to categorize each of the content pieces associated with a color of the corresponding color segment.

17. The note management system of claim 10, wherein the note extraction module is further configured to categorize each of the content pieces associated with a size of the corresponding color segment.

18. The note management system of claim 10, wherein the note extraction module is further configured to label each of the content pieces with a status associated with a color of the corresponding color segment.

19. A non-transitory computer-readable storage device comprising instructions that cause a programmable processor to:
receive image data containing a visual representation of a scene having a plurality of physical notes, each of the plurality of physical notes having a plurality of color segments, wherein at least two of the plurality of color segments are different in size;
generate, by the one or more processors, a plurality of indicators, each indicator indicative of a color class of color values of one or more pixel within the image data;
process the image data to determine, based on the plurality of indicators, a boundary within the image data of a first physical note of the plurality of physical notes;
process the image data to determine, based on the indicators and the boundary for the physical note, boundaries for each of the color segments of the first physical note;
extract, from the image data, respective content for each of the color segments of the first physical note using and the boundaries for each of the color segments of the physical note;
create a digital note representative of the first physical note, the digital note having data indicating each of the color segments for the physical note; and
associate the respective content pieces extracted from the image data with the corresponding color segments of the digital note.

20. The computer-readable storage device of claim 19, wherein the instructions cause the programmable processor to:
create the digital note corresponding to the first physical note as a record within a database to store attributes associated with the physical note, and
update the record with the database to associate the respective record with the content.

* * * * *